US012699511B2

(12) United States Patent
Song et al.

(10) Patent No.: US 12,699,511 B2
(45) Date of Patent: Aug. 4, 2026

(54) MEMORY STORING METADATA AND MEMORY SYSTEM

(71) Applicant: SK hynix Inc., Gyeonggi-do (KR)

(72) Inventors: Choung Ki Song, Gyeonggi-do (KR); Kyung Whan Kim, Gyeonggi-do (KR); Min Su Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 43 days.

(21) Appl. No.: 18/610,273

(22) Filed: Mar. 20, 2024

(65) Prior Publication Data

US 2024/0377952 A1 Nov. 14, 2024

(30) Foreign Application Priority Data

| | | | |
|---|---|---|---|
| May 10, 2023 | (KR) | ..................... | 10-2023-0060666 |
| May 10, 2023 | (KR) | ..................... | 10-2023-0060667 |
| May 10, 2023 | (KR) | ..................... | 10-2023-0060668 |
| Dec. 22, 2023 | (KR) | ..................... | 10-2023-0189143 |

(51) Int. Cl.
*G06F 11/10* (2006.01)
*G06F 3/06* (2006.01)

(52) U.S. Cl.
CPC ............ *G06F 3/061* (2013.01); *G06F 3/0634* (2013.01); *G06F 3/0659* (2013.01); *G06F 3/0673* (2013.01); *G06F 11/1044* (2013.01)

(58) Field of Classification Search
CPC .. G06F 11/1044; G06F 11/1048; G06F 3/061; G06F 3/0634; G06F 3/0659; G06F 3/0673
See application file for complete search history.

(56) References Cited

U.S. PATENT DOCUMENTS

| | | | |
|---|---|---|---|
| 8,842,126 B2 * | 9/2014 | Kruger ................... | G06F 12/08 |
| | | | 345/536 |
| 2017/0220255 A1 * | 8/2017 | Yan ..................... | G06F 12/1045 |
| 2024/0176699 A1 * | 5/2024 | Ayyapureddi ...... | G06F 11/1016 |

* cited by examiner

*Primary Examiner* — Yong J Choe
(74) *Attorney, Agent, or Firm* — IP & T GROUP LLP

(57) ABSTRACT

A memory may include a data transmission/reception circuit and a memory bank including a plurality of cell arrays. When a metadata mode is activated, data and metadata received through the data transmission/reception circuit may be distributed to and stored in the plurality of cell arrays. When the metadata mode is deactivated, the data received through the data transmission/reception circuit may be distributed to and stored in cell arrays except one or more no-access cell arrays, among the plurality of cell arrays.

18 Claims, 18 Drawing Sheets

| C_ADD | 510_0 | 510_1 | 510_2 | 510_3 | 510_4 | 510_5 | 510_6 | 510_7 | 510_8 | 510_9 | 510_10 | 510_11 | 510_12 | 510_13 | 510_14 | 510_15 | 510_16 |
|---|---|---|---|---|---|---|---|---|---|---|---|---|---|---|---|---|---|
| 0 | YI0 | YI0 | YI0 | YI0 | YI0 | YI0 | YI0 | YI0 | YI0 | YI0 | YI0 | YI0 | YI0 | YI0 | YI0 | YI0 | YI0 (M) |
| 1 | YI1 | YI1 | YI1 | YI1 | YI1 | YI1 | YI1 | YI1 | YI1 | YI1 | YI1 | YI1 | YI1 | YI1 | YI1 | YI1 | YI1 (M) |
| 2 | YI2 | YI2 | YI2 | YI2 | YI2 | YI2 | YI2 | YI2 | YI2 | YI2 | YI2 | YI2 | YI2 | YI2 | YI2 | YI2 | YI2 (M) |
| 3 | YI3 | YI3 | YI3 | YI3 | YI3 | YI3 | YI3 | YI3 | YI3 | YI3 | YI3 | YI3 | YI3 | YI3 | YI3 | YI3 | YI3 (M) |
| 4 | YI4 | YI4 | YI4 | YI4 | YI4 | YI4 | YI4 | YI4 | YI4 | YI4 | YI4 | YI4 | YI4 | YI4 | YI4 | YI4 | YI4 (M) |
| 5 | YI5 | YI5 | YI5 | YI5 | YI5 | YI5 | YI5 | YI5 | YI5 | YI5 | YI5 | YI5 | YI5 | YI5 | YI5 | YI5 | YI5 (M) |
| 6 | YI6 | YI6 | YI6 | YI6 | YI6 | YI6 | YI6 | YI6 | YI6 | YI6 | YI6 | YI6 | YI6 | YI6 | YI6 | YI6 | YI6 (M) |
| 7 | YI7 | YI7 | YI7 | YI7 | YI7 | YI7 | YI7 | YI7 | YI7 | YI7 | YI7 | YI7 | YI7 | YI7 | YI7 | YI7 | YI7 (M) |
| 8 | YI8 | YI8 | YI8 | YI8 | YI8 | YI8 | YI8 | YI8 | YI8 | YI8 | YI8 | YI8 | YI8 | YI8 | YI8 | YI8 | YI8 (M) |
| 9 | YI9 | YI9 | YI9 | YI9 | YI9 | YI9 | YI9 | YI9 | YI9 | YI9 | YI9 | YI9 | YI9 | YI9 | YI9 | YI9 | YI9 (M) |
| 10 | YI10 | YI10 | YI10 | YI10 | YI10 | YI10 | YI10 | YI10 | YI10 | YI10 | YI10 | YI10 | YI10 | YI10 | YI10 | YI10 | YI10 (M) |
| 11 | YI11 | YI11 | YI11 | YI11 | YI11 | YI11 | YI11 | YI11 | YI11 | YI11 | YI11 | YI11 | YI11 | YI11 | YI11 | YI11 | YI11 (M) |
| 12 | YI12 | YI12 | YI12 | YI12 | YI12 | YI12 | YI12 | YI12 | YI12 | YI12 | YI12 | YI12 | YI12 | YI12 | YI12 | YI12 | YI12 (M) |
| 13 | YI13 | YI13 | YI13 | YI13 | YI13 | YI13 | YI13 | YI13 | YI13 | YI13 | YI13 | YI13 | YI13 | YI13 | YI13 | YI13 | YI13 (M) |
| 14 | YI14 | YI14 | YI14 | YI14 | YI14 | YI14 | YI14 | YI14 | YI14 | YI14 | YI14 | YI14 | YI14 | YI14 | YI14 | YI14 | YI14 (M) |
| 15 | YI15 | YI15 | YI15 | YI15 | YI15 | YI15 | YI15 | YI15 | YI15 | YI15 | YI15 | YI15 | YI15 | YI15 | YI15 | YI15 | YI15 (M) |
| 16 | YI16 | YI16 | YI16 | YI16 | YI16 | YI16 | YI16 | YI16 | YI16 | YI16 | YI16 | YI16 | YI16 | YI16 | YI16 | YI16 | YI16 (M) |
| 17 | YI17 | YI17 | YI17 | YI17 | YI17 | YI17 | YI17 | YI17 | YI17 | YI17 | YI17 | YI17 | YI17 | YI17 | YI17 | YI17 | YI17 (M) |
| 18 | YI18 | YI18 | YI18 | YI18 | YI18 | YI18 | YI18 | YI18 | YI18 | YI18 | YI18 | YI18 | YI18 | YI18 | YI18 | YI18 | YI18 (M) |
| 19 | YI19 | YI19 | YI19 | YI19 | YI19 | YI19 | YI19 | YI19 | YI19 | YI19 | YI19 | YI19 | YI19 | YI19 | YI19 | YI19 | YI19 (M) |
| 20 | YI20 | YI20 | YI20 | YI20 | YI20 | YI20 | YI20 | YI20 | YI20 | YI20 | YI20 | YI20 | YI20 | YI20 | YI20 | YI20 | YI20 (M) |
| 21 | YI21 | YI21 | YI21 | YI21 | YI21 | YI21 | YI21 | YI21 | YI21 | YI21 | YI21 | YI21 | YI21 | YI21 | YI21 | YI21 | YI21 (M) |
| 22 | YI22 | YI22 | YI22 | YI22 | YI22 | YI22 | YI22 | YI22 | YI22 | YI22 | YI22 | YI22 | YI22 | YI22 | YI22 | YI22 | YI22 (M) |
| 23 | YI23 | YI23 | YI23 | YI23 | YI23 | YI23 | YI23 | YI23 | YI23 | YI23 | YI23 | YI23 | YI23 | YI23 | YI23 | YI23 | YI23 (M) |
| 24 | YI24 | YI24 | YI24 | YI24 | YI24 | YI24 | YI24 | YI24 | YI24 | YI24 | YI24 | YI24 | YI24 | YI24 | YI24 | YI24 | YI24 (M) |

⋮

| 117 | YI117 | YI117 | YI117 | YI117 | YI117 | YI117 | YI117 | YI117 | YI117 | YI117 | YI117 | YI117 | YI117 | YI117 | YI117 | YI117 | YI117 (M) |
|---|---|---|---|---|---|---|---|---|---|---|---|---|---|---|---|---|---|
| 118 | YI118 | YI118 | YI118 | YI118 | YI118 | YI118 | YI118 | YI118 | YI118 | YI118 | YI118 | YI118 | YI118 | YI118 | YI118 | YI118 | YI118 (M) |
| 119 | YI119 | YI119 | YI119 | YI119 | YI119 | YI119 | YI119 | YI119 | YI119 | YI119 | YI119 | YI119 | YI119 | YI119 | YI119 | YI119 | YI119 (M) |
| 120 | YI120 | YI120 | YI120 | YI120 | YI120 | YI120 | YI120 | YI120 | YI120 | YI120 | YI120 | YI120 | YI120 | YI120 | YI120 | YI120 | YI120 (M) |

FIG. 8A

| C_ADD | 510_0 | 510_1 | 510_2 | 510_3 | 510_4 | 510_5 | 510_6 | 510_7 | 510_8 | 510_9 | 510_10 | 510_11 | 510_12 | 510_13 | 510_14 | 510_15 | 510_16 |
|---|---|---|---|---|---|---|---|---|---|---|---|---|---|---|---|---|---|
| 0 | X | YI0 | YI0 | YI0 | YI0 | YI0 | YI0 | YI0 | YI0 | YI0 | YI0 | YI0 | YI0 | YI0 | YI0 | YI0 | YI0 |
| 1 | YI1 | X | YI1 | YI1 | YI1 | YI1 | YI1 | YI1 | YI1 | YI1 | YI1 | YI1 | YI1 | YI1 | YI1 | YI1 | YI1 |
| 2 | YI2 | YI2 | X | YI2 | YI2 | YI2 | YI2 | YI2 | YI2 | YI2 | YI2 | YI2 | YI2 | YI2 | YI2 | YI2 | YI2 |
| 3 | YI3 | YI3 | YI3 | X | YI3 | YI3 | YI3 | YI3 | YI3 | YI3 | YI3 | YI3 | YI3 | YI3 | YI3 | YI3 | YI3 |
| 4 | YI4 | YI4 | YI4 | YI4 | X | YI4 | YI4 | YI4 | YI4 | YI4 | YI4 | YI4 | YI4 | YI4 | YI4 | YI4 | YI4 |
| 5 | YI5 | YI5 | YI5 | YI5 | YI5 | X | YI5 | YI5 | YI5 | YI5 | YI5 | YI5 | YI5 | YI5 | YI5 | YI5 | YI5 |
| 6 | YI6 | YI6 | YI6 | YI6 | YI6 | YI6 | X | YI6 | YI6 | YI6 | YI6 | YI6 | YI6 | YI6 | YI6 | YI6 | YI6 |
| 7 | YI7 | YI7 | YI7 | YI7 | YI7 | YI7 | YI7 | X | YI7 | YI7 | YI7 | YI7 | YI7 | YI7 | YI7 | YI7 | YI7 |
| 8 | YI8 | YI8 | YI8 | YI8 | YI8 | YI8 | YI8 | YI8 | X | YI8 | YI8 | YI8 | YI8 | YI8 | YI8 | YI8 | YI8 |
| 9 | YI9 | YI9 | YI9 | YI9 | YI9 | YI9 | YI9 | YI9 | YI9 | X | YI9 | YI9 | YI9 | YI9 | YI9 | YI9 | YI9 |
| 10 | YI10 | YI10 | YI10 | YI10 | YI10 | YI10 | YI10 | YI10 | YI10 | YI10 | X | YI10 | YI10 | YI10 | YI10 | YI10 | YI10 |
| 11 | YI11 | YI11 | YI11 | YI11 | YI11 | YI11 | YI11 | YI11 | YI11 | YI11 | YI11 | X | YI11 | YI11 | YI11 | YI11 | YI11 |
| 12 | YI12 | YI12 | YI12 | YI12 | YI12 | YI12 | YI12 | YI12 | YI12 | YI12 | YI12 | YI12 | X | YI12 | YI12 | YI12 | YI12 |
| 13 | YI13 | YI13 | YI13 | YI13 | YI13 | YI13 | YI13 | YI13 | YI13 | YI13 | YI13 | YI13 | YI13 | X | YI13 | YI13 | YI13 |
| 14 | YI14 | YI14 | YI14 | YI14 | YI14 | YI14 | YI14 | YI14 | YI14 | YI14 | YI14 | YI14 | YI14 | YI14 | X | YI14 | YI14 |
| 15 | YI15 | YI15 | YI15 | YI15 | YI15 | YI15 | YI15 | YI15 | YI15 | YI15 | YI15 | YI15 | YI15 | YI15 | YI15 | X | YI15 |
| 16 | X | YI16 | YI16 | YI16 | YI16 | YI16 | YI16 | YI16 | YI16 | YI16 | YI16 | YI16 | YI16 | YI16 | YI16 | YI16 | YI16 |
| 17 | YI17 | X | YI17 | YI17 | YI17 | YI17 | YI17 | YI17 | YI17 | YI17 | YI17 | YI17 | YI17 | YI17 | YI17 | YI17 | YI17 |
| 18 | YI18 | YI18 | X | YI18 | YI18 | YI18 | YI18 | YI18 | YI18 | YI18 | YI18 | YI18 | YI18 | YI18 | YI18 | YI18 | YI18 |
| 19 | YI19 | YI19 | YI19 | X | YI19 | YI19 | YI19 | YI19 | YI19 | YI19 | YI19 | YI19 | YI19 | YI19 | YI19 | YI19 | YI19 |
| 20 | YI20 | YI20 | YI20 | YI20 | X | YI20 | YI20 | YI20 | YI20 | YI20 | YI20 | YI20 | YI20 | YI20 | YI20 | YI20 | YI20 |
| 21 | YI21 | YI21 | YI21 | YI21 | YI21 | X | YI21 | YI21 | YI21 | YI21 | YI21 | YI21 | YI21 | YI21 | YI21 | YI21 | YI21 |
| 22 | YI22 | YI22 | YI22 | YI22 | YI22 | YI22 | X | YI22 | YI22 | YI22 | YI22 | YI22 | YI22 | YI22 | YI22 | YI22 | YI22 |
| 23 | YI23 | YI23 | YI23 | YI23 | YI23 | YI23 | YI23 | X | YI23 | YI23 | YI23 | YI23 | YI23 | YI23 | YI23 | YI23 | YI23 |
| 24 | YI24 | YI24 | YI24 | YI24 | YI24 | YI24 | YI24 | YI24 | X | YI24 | YI24 | YI24 | YI24 | YI24 | YI24 | YI24 | YI24 |
| 25 | YI25 | YI25 | YI25 | YI25 | YI25 | YI25 | YI25 | YI25 | YI25 | X | YI25 | YI25 | YI25 | YI25 | YI25 | YI25 | YI25 |
| 26 | YI26 | YI26 | YI26 | YI26 | YI26 | YI26 | YI26 | YI26 | YI26 | YI26 | X | YI26 | YI26 | YI26 | YI26 | YI26 | YI26 |
| 27 | YI27 | YI27 | YI27 | YI27 | YI27 | YI27 | YI27 | YI27 | YI27 | YI27 | YI27 | X | YI27 | YI27 | YI27 | YI27 | YI27 |
| 28 | YI28 | YI28 | YI28 | YI28 | YI28 | YI28 | YI28 | YI28 | YI28 | YI28 | YI28 | YI28 | X | YI28 | YI28 | YI28 | YI28 |
| 29 | YI29 | YI29 | YI29 | YI29 | YI29 | YI29 | YI29 | YI29 | YI29 | YI29 | YI29 | YI29 | YI29 | X | YI29 | YI29 | YI29 |
| 30 | YI30 | YI30 | YI30 | YI30 | YI30 | YI30 | YI30 | YI30 | YI30 | YI30 | YI30 | YI30 | YI30 | YI30 | X | YI30 | YI30 |
| 31 | YI31 | YI31 | YI31 | YI31 | YI31 | YI31 | YI31 | YI31 | YI31 | YI31 | YI31 | YI31 | YI31 | YI31 | YI31 | X | YI31 |

FIG. 8B

| C_ADD | 510_0 | 510_1 | 510_2 | 510_3 | 510_4 | 510_5 | 510_6 | 510_7 | 510_8 | 510_9 | 510_10 | 510_11 | 510_12 | 510_13 | 510_14 | 510_15 | 510_16 |
|---|---|---|---|---|---|---|---|---|---|---|---|---|---|---|---|---|---|
| 32 | X | YI32 | YI32 | YI32 | YI32 | YI32 | YI32 | YI32 | YI32 | YI32 | YI32 | YI32 | YI32 | YI32 | YI32 | YI32 | YI32 |
| 33 | YI33 | X | YI33 | YI33 | YI33 | YI33 | YI33 | YI33 | YI33 | YI33 | YI33 | YI33 | YI33 | YI33 | YI33 | YI33 | YI33 |
| 34 | YI34 | YI34 | X | YI34 | YI34 | YI34 | YI34 | YI34 | YI34 | YI34 | YI34 | YI34 | YI34 | YI34 | YI34 | YI34 | YI34 |
| 35 | YI35 | YI35 | YI35 | X | YI35 | YI35 | YI35 | YI35 | YI35 | YI35 | YI35 | YI35 | YI35 | YI35 | YI35 | YI35 | YI35 |
| 36 | YI36 | YI36 | YI36 | YI36 | X | YI36 | YI36 | YI36 | YI36 | YI36 | YI36 | YI36 | YI36 | YI36 | YI36 | YI36 | YI36 |
| 37 | YI37 | YI37 | YI37 | YI37 | YI37 | X | YI37 | YI37 | YI37 | YI37 | YI37 | YI37 | YI37 | YI37 | YI37 | YI37 | YI37 |
| 38 | YI38 | YI38 | YI38 | YI38 | YI38 | YI38 | X | YI38 | YI38 | YI38 | YI38 | YI38 | YI38 | YI38 | YI38 | YI38 | YI38 |
| 39 | YI39 | YI39 | YI39 | YI39 | YI39 | YI39 | YI39 | X | YI39 | YI39 | YI39 | YI39 | YI39 | YI39 | YI39 | YI39 | YI39 |
| 40 | YI40 | YI40 | YI40 | YI40 | YI40 | YI40 | YI40 | YI40 | X | YI40 | YI40 | YI40 | YI40 | YI40 | YI40 | YI40 | YI40 |
| 41 | YI41 | YI41 | YI41 | YI41 | YI41 | YI41 | YI41 | YI41 | YI41 | X | YI41 | YI41 | YI41 | YI41 | YI41 | YI41 | YI41 |
| 42 | YI42 | YI42 | YI42 | YI42 | YI42 | YI42 | YI42 | YI42 | YI42 | YI42 | X | YI42 | YI42 | YI42 | YI42 | YI42 | YI42 |
| 43 | YI43 | YI43 | YI43 | YI43 | YI43 | YI43 | YI43 | YI43 | YI43 | YI43 | YI43 | X | YI43 | YI43 | YI43 | YI43 | YI43 |
| 44 | YI44 | YI44 | YI44 | YI44 | YI44 | YI44 | YI44 | YI44 | YI44 | YI44 | YI44 | YI44 | X | YI44 | YI44 | YI44 | YI44 |
| 45 | YI45 | YI45 | YI45 | YI45 | YI45 | YI45 | YI45 | YI45 | YI45 | YI45 | YI45 | YI45 | YI45 | X | YI45 | YI45 | YI45 |
| 46 | YI46 | YI46 | YI46 | YI46 | YI46 | YI46 | YI46 | YI46 | YI46 | YI46 | YI46 | YI46 | YI46 | YI46 | X | YI46 | YI46 |
| 47 | YI47 | YI47 | YI47 | YI47 | YI47 | YI47 | YI47 | YI47 | YI47 | YI47 | YI47 | YI47 | YI47 | YI47 | YI47 | X | YI47 |
| 48 | X | YI48 | YI48 | YI48 | YI48 | YI48 | YI48 | YI48 | YI48 | YI48 | YI48 | YI48 | YI48 | YI48 | YI48 | YI48 | YI48 |
| 49 | YI49 | X | YI49 | YI49 | YI49 | YI49 | YI49 | YI49 | YI49 | YI49 | YI49 | YI49 | YI49 | YI49 | YI49 | YI49 | YI49 |
| 50 | YI50 | YI50 | X | YI50 | YI50 | YI50 | YI50 | YI50 | YI50 | YI50 | YI50 | YI50 | YI50 | YI50 | YI50 | YI50 | YI50 |
| 51 | YI51 | YI51 | YI51 | X | YI51 | YI51 | YI51 | YI51 | YI51 | YI51 | YI51 | YI51 | YI51 | YI51 | YI51 | YI51 | YI51 |
| 52 | YI52 | YI52 | YI52 | YI52 | X | YI52 | YI52 | YI52 | YI52 | YI52 | YI52 | YI52 | YI52 | YI52 | YI52 | YI52 | YI52 |
| 53 | YI53 | YI53 | YI53 | YI53 | YI53 | X | YI53 | YI53 | YI53 | YI53 | YI53 | YI53 | YI53 | YI53 | YI53 | YI53 | YI53 |
| 54 | YI54 | YI54 | YI54 | YI54 | YI54 | YI54 | X | YI54 | YI54 | YI54 | YI54 | YI54 | YI54 | YI54 | YI54 | YI54 | YI54 |
| 55 | YI55 | YI55 | YI55 | YI55 | YI55 | YI55 | YI55 | X | YI55 | YI55 | YI55 | YI55 | YI55 | YI55 | YI55 | YI55 | YI55 |
| 56 | YI56 | YI56 | YI56 | YI56 | YI56 | YI56 | YI56 | YI56 | X | YI56 | YI56 | YI56 | YI56 | YI56 | YI56 | YI56 | YI56 |
| 57 | YI57 | YI57 | YI57 | YI57 | YI57 | YI57 | YI57 | YI57 | YI57 | X | YI57 | YI57 | YI57 | YI57 | YI57 | YI57 | YI57 |
| 58 | YI58 | YI58 | YI58 | YI58 | YI58 | YI58 | YI58 | YI58 | YI58 | YI58 | X | YI58 | YI58 | YI58 | YI58 | YI58 | YI58 |
| 59 | YI59 | YI59 | YI59 | YI59 | YI59 | YI59 | YI59 | YI59 | YI59 | YI59 | YI59 | X | YI59 | YI59 | YI59 | YI59 | YI59 |
| 60 | YI60 | YI60 | YI60 | YI60 | YI60 | YI60 | YI60 | YI60 | YI60 | YI60 | YI60 | YI60 | X | YI60 | YI60 | YI60 | YI60 |
| 61 | YI61 | YI61 | YI61 | YI61 | YI61 | YI61 | YI61 | YI61 | YI61 | YI61 | YI61 | YI61 | YI61 | X | YI61 | YI61 | YI61 |
| 62 | YI62 | YI62 | YI62 | YI62 | YI62 | YI62 | YI62 | YI62 | YI62 | YI62 | YI62 | YI62 | YI62 | YI62 | X | YI62 | YI62 |
| 63 | YI63 | YI63 | YI63 | YI63 | YI63 | YI63 | YI63 | YI63 | YI63 | YI63 | YI63 | YI63 | YI63 | YI63 | YI63 | X | YI63 |

FIG. 8C

| C_ADD | 510_0 | 510_1 | 510_2 | 510_3 | 510_4 | 510_5 | 510_6 | 510_7 | 510_8 | 510_9 | 510_10 | 510_11 | 510_12 | 510_13 | 510_14 | 510_15 | 510_16 |
|---|---|---|---|---|---|---|---|---|---|---|---|---|---|---|---|---|---|
| 64 | X | YI64 | YI64 | YI64 | YI64 | YI64 | YI64 | YI64 | YI64 | YI64 | YI64 | YI64 | YI64 | YI64 | YI64 | YI64 | YI64 |
| 65 | YI65 | X | YI65 | YI65 | YI65 | YI65 | YI65 | YI65 | YI65 | YI65 | YI65 | YI65 | YI65 | YI65 | YI65 | YI65 | YI65 |
| 66 | YI66 | YI66 | X | YI66 | YI66 | YI66 | YI66 | YI66 | YI66 | YI66 | YI66 | YI66 | YI66 | YI66 | YI66 | YI66 | YI66 |
| 67 | YI67 | YI67 | YI67 | X | YI67 | YI67 | YI67 | YI67 | YI67 | YI67 | YI67 | YI67 | YI67 | YI67 | YI67 | YI67 | YI67 |
| 68 | YI68 | YI68 | YI68 | YI68 | X | YI68 | YI68 | YI68 | YI68 | YI68 | YI68 | YI68 | YI68 | YI68 | YI68 | YI68 | YI68 |
| 69 | YI69 | YI69 | YI69 | YI69 | YI69 | X | YI69 | YI69 | YI69 | YI69 | YI69 | YI69 | YI69 | YI69 | YI69 | YI69 | YI69 |
| 70 | YI70 | YI70 | YI70 | YI70 | YI70 | YI70 | X | YI70 | YI70 | YI70 | YI70 | YI70 | YI70 | YI70 | YI70 | YI70 | YI70 |
| 71 | YI71 | YI71 | YI71 | YI71 | YI71 | YI71 | YI71 | X | YI71 | YI71 | YI71 | YI71 | YI71 | YI71 | YI71 | YI71 | YI71 |
| 72 | YI72 | YI72 | YI72 | YI72 | YI72 | YI72 | YI72 | YI72 | X | YI72 | YI72 | YI72 | YI72 | YI72 | YI72 | YI72 | YI72 |
| 73 | YI73 | YI73 | YI73 | YI73 | YI73 | YI73 | YI73 | YI73 | YI73 | X | YI73 | YI73 | YI73 | YI73 | YI73 | YI73 | YI73 |
| 74 | YI74 | YI74 | YI74 | YI74 | YI74 | YI74 | YI74 | YI74 | YI74 | YI74 | X | YI74 | YI74 | YI74 | YI74 | YI74 | YI74 |
| 75 | YI75 | YI75 | YI75 | YI75 | YI75 | YI75 | YI75 | YI75 | YI75 | YI75 | YI75 | X | YI75 | YI75 | YI75 | YI75 | YI75 |
| 76 | YI76 | YI76 | YI76 | YI76 | YI76 | YI76 | YI76 | YI76 | YI76 | YI76 | YI76 | YI76 | X | YI76 | YI76 | YI76 | YI76 |
| 77 | YI77 | YI77 | YI77 | YI77 | YI77 | YI77 | YI77 | YI77 | YI77 | YI77 | YI77 | YI77 | YI77 | X | YI77 | YI77 | YI77 |
| 78 | YI78 | YI78 | YI78 | YI78 | YI78 | YI78 | YI78 | YI78 | YI78 | YI78 | YI78 | YI78 | YI78 | YI78 | X | YI78 | YI78 |
| 79 | YI79 | YI79 | YI79 | YI79 | YI79 | YI79 | YI79 | YI79 | YI79 | YI79 | YI79 | YI79 | YI79 | YI79 | YI79 | X | YI79 |
| 80 | X | YI80 | YI80 | YI80 | YI80 | YI80 | YI80 | YI80 | YI80 | YI80 | YI80 | YI80 | YI80 | YI80 | YI80 | YI80 | YI80 |
| 81 | YI81 | X | YI81 | YI81 | YI81 | YI81 | YI81 | YI81 | YI81 | YI81 | YI81 | YI81 | YI81 | YI81 | YI81 | YI81 | YI81 |
| 82 | YI82 | YI82 | X | YI82 | YI82 | YI82 | YI82 | YI82 | YI82 | YI82 | YI82 | YI82 | YI82 | YI82 | YI82 | YI82 | YI82 |
| 83 | YI83 | YI83 | YI83 | X | YI83 | YI83 | YI83 | YI83 | YI83 | YI83 | YI83 | YI83 | YI83 | YI83 | YI83 | YI83 | YI83 |
| 84 | YI84 | YI84 | YI84 | YI84 | X | YI84 | YI84 | YI84 | YI84 | YI84 | YI84 | YI84 | YI84 | YI84 | YI84 | YI84 | YI84 |
| 85 | YI85 | YI85 | YI85 | YI85 | YI85 | X | YI85 | YI85 | YI85 | YI85 | YI85 | YI85 | YI85 | YI85 | YI85 | YI85 | YI85 |
| 86 | YI86 | YI86 | YI86 | YI86 | YI86 | YI86 | X | YI86 | YI86 | YI86 | YI86 | YI86 | YI86 | YI86 | YI86 | YI86 | YI86 |
| 87 | YI87 | YI87 | YI87 | YI87 | YI87 | YI87 | YI87 | X | YI87 | YI87 | YI87 | YI87 | YI87 | YI87 | YI87 | YI87 | YI87 |
| 88 | YI88 | YI88 | YI88 | YI88 | YI88 | YI88 | YI88 | YI88 | X | YI88 | YI88 | YI88 | YI88 | YI88 | YI88 | YI88 | YI88 |
| 89 | YI89 | YI89 | YI89 | YI89 | YI89 | YI89 | YI89 | YI89 | YI89 | X | YI89 | YI89 | YI89 | YI89 | YI89 | YI89 | YI89 |
| 90 | YI90 | YI90 | YI90 | YI90 | YI90 | YI90 | YI90 | YI90 | YI90 | YI90 | X | YI90 | YI90 | YI90 | YI90 | YI90 | YI90 |
| 91 | YI91 | YI91 | YI91 | YI91 | YI91 | YI91 | YI91 | YI91 | YI91 | YI91 | YI91 | X | YI91 | YI91 | YI91 | YI91 | YI91 |
| 92 | YI92 | YI92 | YI92 | YI92 | YI92 | YI92 | YI92 | YI92 | YI92 | YI92 | YI92 | YI92 | X | YI92 | YI92 | YI92 | YI92 |
| 93 | YI93 | YI93 | YI93 | YI93 | YI93 | YI93 | YI93 | YI93 | YI93 | YI93 | YI93 | YI93 | YI93 | X | YI93 | YI93 | YI93 |
| 94 | YI94 | YI94 | YI94 | YI94 | YI94 | YI94 | YI94 | YI94 | YI94 | YI94 | YI94 | YI94 | YI94 | YI94 | X | YI94 | YI94 |
| 95 | YI95 | YI95 | YI95 | YI95 | YI95 | YI95 | YI95 | YI95 | YI95 | YI95 | YI95 | YI95 | YI95 | YI95 | YI95 | X | YI95 |

FIG. 8D

| C_ADD | 510_0 | 510_1 | 510_2 | 510_3 | 510_4 | 510_5 | 510_6 | 510_7 | 510_8 | 510_9 | 510_10 | 510_11 | 510_12 | 510_13 | 510_14 | 510_15 | 510_16 |
|---|---|---|---|---|---|---|---|---|---|---|---|---|---|---|---|---|---|
| 96 | X | YI96 | YI96 | YI96 | YI96 | YI96 | YI96 | YI96 | YI96 | YI96 | YI96 | YI96 | YI96 | YI96 | YI96 | YI96 | YI96 |
| 97 | YI97 | X | YI97 | YI97 | YI97 | YI97 | YI97 | YI97 | YI97 | YI97 | YI97 | YI97 | YI97 | YI97 | YI97 | YI97 | YI97 |
| 98 | YI98 | YI98 | X | YI98 | YI98 | YI98 | YI98 | YI98 | YI98 | YI98 | YI98 | YI98 | YI98 | YI98 | YI98 | YI98 | YI98 |
| 99 | YI99 | YI99 | YI99 | X | YI99 | YI99 | YI99 | YI99 | YI99 | YI99 | YI99 | YI99 | YI99 | YI99 | YI99 | YI99 | YI99 |
| 100 | YI100 | YI100 | YI100 | YI100 | X | YI100 | YI100 | YI100 | YI100 | YI100 | YI100 | YI100 | YI100 | YI100 | YI100 | YI100 | YI100 |
| 101 | YI101 | YI101 | YI101 | YI101 | YI101 | X | YI101 | YI101 | YI101 | YI101 | YI101 | YI101 | YI101 | YI101 | YI101 | YI101 | YI101 |
| 102 | YI102 | YI102 | YI102 | YI102 | YI102 | YI102 | X | YI102 | YI102 | YI102 | YI102 | YI102 | YI102 | YI102 | YI102 | YI102 | YI102 |
| 103 | YI103 | YI103 | YI103 | YI103 | YI103 | YI103 | YI103 | X | YI103 | YI103 | YI103 | YI103 | YI103 | YI103 | YI103 | YI103 | YI103 |
| 104 | YI104 | YI104 | YI104 | YI104 | YI104 | YI104 | YI104 | YI104 | X | YI104 | YI104 | YI104 | YI104 | YI104 | YI104 | YI104 | YI104 |
| 105 | YI105 | YI105 | YI105 | YI105 | YI105 | YI105 | YI105 | YI105 | YI105 | X | YI105 | YI105 | YI105 | YI105 | YI105 | YI105 | YI105 |
| 106 | YI106 | YI106 | YI106 | YI106 | YI106 | YI106 | YI106 | YI106 | YI106 | YI106 | X | YI106 | YI106 | YI106 | YI106 | YI106 | YI106 |
| 107 | YI107 | YI107 | YI107 | YI107 | YI107 | YI107 | YI107 | YI107 | YI107 | YI107 | YI107 | X | YI107 | YI107 | YI107 | YI107 | YI107 |
| 108 | YI108 | YI108 | YI108 | YI108 | YI108 | YI108 | YI108 | YI108 | YI108 | YI108 | YI108 | YI108 | X | YI108 | YI108 | YI108 | YI108 |
| 109 | YI109 | YI109 | YI109 | YI109 | YI109 | YI109 | YI109 | YI109 | YI109 | YI109 | YI109 | YI109 | YI109 | X | YI109 | YI109 | YI109 |
| 110 | YI110 | YI110 | YI110 | YI110 | YI110 | YI110 | YI110 | YI110 | YI110 | YI110 | YI110 | YI110 | YI110 | YI110 | X | YI110 | YI110 |
| 111 | YI111 | YI111 | YI111 | YI111 | YI111 | YI111 | YI111 | YI111 | YI111 | YI111 | YI111 | YI111 | YI111 | YI111 | YI111 | X | YI111 |
| 112 | X | YI112 | YI112 | YI112 | YI112 | YI112 | YI112 | YI112 | YI112 | YI112 | YI112 | YI112 | YI112 | YI112 | YI112 | YI112 | YI112 |
| 113 | YI113 | X | YI113 | YI113 | YI113 | YI113 | YI113 | YI113 | YI113 | YI113 | YI113 | YI113 | YI113 | YI113 | YI113 | YI113 | YI113 |
| 114 | YI114 | YI114 | X | YI114 | YI114 | YI114 | YI114 | YI114 | YI114 | YI114 | YI114 | YI114 | YI114 | YI114 | YI114 | YI114 | YI114 |
| 115 | YI115 | YI115 | YI115 | X | YI115 | YI115 | YI115 | YI115 | YI115 | YI115 | YI115 | YI115 | YI115 | YI115 | YI115 | YI115 | YI115 |
| 116 | YI116 | YI116 | YI116 | YI116 | X | YI116 | YI116 | YI116 | YI116 | YI116 | YI116 | YI116 | YI116 | YI116 | YI116 | YI116 | YI116 |
| 117 | YI117 | YI117 | YI117 | YI117 | YI117 | X | YI117 | YI117 | YI117 | YI117 | YI117 | YI117 | YI117 | YI117 | YI117 | YI117 | YI117 |
| 118 | YI118 | YI118 | YI118 | YI118 | YI118 | YI118 | X | YI118 | YI118 | YI118 | YI118 | YI118 | YI118 | YI118 | YI118 | YI118 | YI118 |
| 119 | YI119 | YI119 | YI119 | YI119 | YI119 | YI119 | YI119 | X | YI119 | YI119 | YI119 | YI119 | YI119 | YI119 | YI119 | YI119 | YI119 |
| 120 | YI120 | YI120 | YI120 | YI120 | YI120 | YI120 | YI120 | YI120 | X | YI120 | YI120 | YI120 | YI120 | YI120 | YI120 | YI120 | YI120 |
| 121 | YI0 | YI1 | YI2 | YI3 | YI4 | YI5 | YI6 | YI7 | YI8 | YI9 | YI10 | YI11 | YI12 | YI13 | YI14 | YI15 | X |
| 122 | YI16 | YI17 | YI18 | YI19 | YI20 | YI21 | YI22 | YI23 | YI24 | YI25 | YI26 | YI27 | YI28 | YI29 | YI30 | YI31 | X |
| 123 | YI32 | YI33 | YI34 | YI35 | YI36 | YI37 | YI38 | YI39 | YI40 | YI41 | YI42 | YI43 | YI44 | YI45 | YI46 | YI47 | X |
| 124 | YI48 | YI49 | YI50 | YI51 | YI52 | YI53 | YI54 | YI55 | YI56 | YI57 | YI58 | YI59 | YI60 | YI61 | YI62 | YI63 | X |
| 125 | YI64 | YI65 | YI66 | YI67 | YI68 | YI69 | YI70 | YI71 | YI72 | YI73 | YI74 | YI75 | YI76 | YI77 | YI78 | YI79 | X |
| 126 | YI80 | YI81 | YI82 | YI83 | YI84 | YI85 | YI86 | YI87 | YI88 | YI89 | YI90 | YI91 | YI92 | YI93 | YI94 | YI95 | X |
| 127 | YI96 | YI97 | YI98 | YI99 | YI100 | YI101 | YI102 | YI103 | YI104 | YI105 | YI106 | YI107 | YI108 | YI109 | YI110 | YI111 | X |

FIG. 11

| C_ADD | 1010_0 | 1010_1 | 1010_2 | 1010_3 | 1010_4 | 1010_5 | 1010_6 | 1010_7 | 1010_8 | 1010_9 | 1010_10 | 1010_11 | 1010_12 | 1010_13 | 1010_14 | 1010_15 | 1010_16 | 1010_17 |
|---|---|---|---|---|---|---|---|---|---|---|---|---|---|---|---|---|---|---|
| 0 | YI0 | YI0 | YI0 | YI0 | YI0 | YI0 | YI0 | YI0 | YI0 | YI0 | YI0 | YI0 | YI0 | YI0 | YI0 | YI0 | YI0 (M) | YI0 (E) |
| 1 | YI1 | YI1 | YI1 | YI1 | YI1 | YI1 | YI1 | YI1 | YI1 | YI1 | YI1 | YI1 | YI1 | YI1 | YI1 | YI1 | YI1 (M) | YI1 (E) |
| 2 | YI2 | YI2 | YI2 | YI2 | YI2 | YI2 | YI2 | YI2 | YI2 | YI2 | YI2 | YI2 | YI2 | YI2 | YI2 | YI2 | YI2 (M) | YI2 (E) |
| 3 | YI3 | YI3 | YI3 | YI3 | YI3 | YI3 | YI3 | YI3 | YI3 | YI3 | YI3 | YI3 | YI3 | YI3 | YI3 | YI3 | YI3 (M) | YI3 (E) |
| 4 | YI4 | YI4 | YI4 | YI4 | YI4 | YI4 | YI4 | YI4 | YI4 | YI4 | YI4 | YI4 | YI4 | YI4 | YI4 | YI4 | YI4 (M) | YI4 (E) |
| 5 | YI5 | YI5 | YI5 | YI5 | YI5 | YI5 | YI5 | YI5 | YI5 | YI5 | YI5 | YI5 | YI5 | YI5 | YI5 | YI5 | YI5 (M) | YI5 (E) |
| 6 | YI6 | YI6 | YI6 | YI6 | YI6 | YI6 | YI6 | YI6 | YI6 | YI6 | YI6 | YI6 | YI6 | YI6 | YI6 | YI6 | YI6 (M) | YI6 (E) |
| 7 | YI7 | YI7 | YI7 | YI7 | YI7 | YI7 | YI7 | YI7 | YI7 | YI7 | YI7 | YI7 | YI7 | YI7 | YI7 | YI7 | YI7 (M) | YI7 (E) |
| 8 | YI8 | YI8 | YI8 | YI8 | YI8 | YI8 | YI8 | YI8 | YI8 | YI8 | YI8 | YI8 | YI8 | YI8 | YI8 | YI8 | YI8 (M) | YI8 (E) |
| 9 | YI9 | YI9 | YI9 | YI9 | YI9 | YI9 | YI9 | YI9 | YI9 | YI9 | YI9 | YI9 | YI9 | YI9 | YI9 | YI9 | YI9 (M) | YI9 (E) |
| 10 | YI10 | YI10 | YI10 | YI10 | YI10 | YI10 | YI10 | YI10 | YI10 | YI10 | YI10 | YI10 | YI10 | YI10 | YI10 | YI10 | YI10 (M) | YI10 (E) |
| 11 | YI11 | YI11 | YI11 | YI11 | YI11 | YI11 | YI11 | YI11 | YI11 | YI11 | YI11 | YI11 | YI11 | YI11 | YI11 | YI11 | YI11 (M) | YI11 (E) |
| 12 | YI12 | YI12 | YI12 | YI12 | YI12 | YI12 | YI12 | YI12 | YI12 | YI12 | YI12 | YI12 | YI12 | YI12 | YI12 | YI12 | YI12 (M) | YI12 (E) |
| 13 | YI13 | YI13 | YI13 | YI13 | YI13 | YI13 | YI13 | YI13 | YI13 | YI13 | YI13 | YI13 | YI13 | YI13 | YI13 | YI13 | YI13 (M) | YI13 (E) |
| 14 | YI14 | YI14 | YI14 | YI14 | YI14 | YI14 | YI14 | YI14 | YI14 | YI14 | YI14 | YI14 | YI14 | YI14 | YI14 | YI14 | YI14 (M) | YI14 (E) |
| 15 | YI15 | YI15 | YI15 | YI15 | YI15 | YI15 | YI15 | YI15 | YI15 | YI15 | YI15 | YI15 | YI15 | YI15 | YI15 | YI15 | YI15 (M) | YI15 (E) |
| 16 | YI16 | YI16 | YI16 | YI16 | YI16 | YI16 | YI16 | YI16 | YI16 | YI16 | YI16 | YI16 | YI16 | YI16 | YI16 | YI16 | YI16 (M) | YI16 (E) |
| 17 | YI17 | YI17 | YI17 | YI17 | YI17 | YI17 | YI17 | YI17 | YI17 | YI17 | YI17 | YI17 | YI17 | YI17 | YI17 | YI17 | YI17 (M) | YI17 (E) |
| 18 | YI18 | YI18 | YI18 | YI18 | YI18 | YI18 | YI18 | YI18 | YI18 | YI18 | YI18 | YI18 | YI18 | YI18 | YI18 | YI18 | YI18 (M) | YI18 (E) |
| 19 | YI19 | YI19 | YI19 | YI19 | YI19 | YI19 | YI19 | YI19 | YI19 | YI19 | YI19 | YI19 | YI19 | YI19 | YI19 | YI19 | YI19 (M) | YI19 (E) |
| 20 | YI20 | YI20 | YI20 | YI20 | YI20 | YI20 | YI20 | YI20 | YI20 | YI20 | YI20 | YI20 | YI20 | YI20 | YI20 | YI20 | YI20 (M) | YI20 (E) |
| 21 | YI21 | YI21 | YI21 | YI21 | YI21 | YI21 | YI21 | YI21 | YI21 | YI21 | YI21 | YI21 | YI21 | YI21 | YI21 | YI21 | YI21 (M) | YI21 (E) |
| 22 | YI22 | YI22 | YI22 | YI22 | YI22 | YI22 | YI22 | YI22 | YI22 | YI22 | YI22 | YI22 | YI22 | YI22 | YI22 | YI22 | YI22 (M) | YI22 (E) |
| 23 | YI23 | YI23 | YI23 | YI23 | YI23 | YI23 | YI23 | YI23 | YI23 | YI23 | YI23 | YI23 | YI23 | YI23 | YI23 | YI23 | YI23 (M) | YI23 (E) |
| 24 | YI24 | YI24 | YI24 | YI24 | YI24 | YI24 | YI24 | YI24 | YI24 | YI24 | YI24 | YI24 | YI24 | YI24 | YI24 | YI24 | YI24 (M) | YI24 (E) |
| ⋮ | | | | | | | | | | | | | | | | | | |
| 117 | YI117 | YI117 | YI117 | YI117 | YI117 | YI117 | YI117 | YI117 | YI117 | YI117 | YI117 | YI117 | YI117 | YI117 | YI117 | YI117 | YI117 (M) | YI117 (E) |
| 118 | YI118 | YI118 | YI118 | YI118 | YI118 | YI118 | YI118 | YI118 | YI118 | YI118 | YI118 | YI118 | YI118 | YI118 | YI118 | YI118 | YI118 (M) | YI118 (E) |
| 119 | YI119 | YI119 | YI119 | YI119 | YI119 | YI119 | YI119 | YI119 | YI119 | YI119 | YI119 | YI119 | YI119 | YI119 | YI119 | YI119 | YI119 (M) | YI119 (E) |
| 120 | YI120 | YI120 | YI120 | YI120 | YI120 | YI120 | YI120 | YI120 | YI120 | YI120 | YI120 | YI120 | YI120 | YI120 | YI120 | YI120 | YI120 (M) | YI120 (E) |

FIG. 12A

| C_ADD | 1010_0 | 1010_1 | 1010_2 | 1010_3 | 1010_4 | 1010_5 | 1010_6 | 1010_7 | 1010_8 | 1010_9 | 1010_10 | 1010_11 | 1010_12 | 1010_13 | 1010_14 | 1010_15 | 1010_16 | 1010_17 |
|---|---|---|---|---|---|---|---|---|---|---|---|---|---|---|---|---|---|---|
| 0 | X | YI0 | YI0 | YI0 | YI0 | YI0 | YI0 | YI0 | YI0 | YI0 | YI0 | YI0 | YI0 | YI0 | YI0 | YI0 | YI0 | YI0 (E) |
| 1 | YI1 | X | YI1 | YI1 | YI1 | YI1 | YI1 | YI1 | YI1 | YI1 | YI1 | YI1 | YI1 | YI1 | YI1 | YI1 | YI1 | YI1 (E) |
| 2 | YI2 | YI2 | X | YI2 | YI2 | YI2 | YI2 | YI2 | YI2 | YI2 | YI2 | YI2 | YI2 | YI2 | YI2 | YI2 | YI2 | YI2 (E) |
| 3 | YI3 | YI3 | YI3 | X | YI3 | YI3 | YI3 | YI3 | YI3 | YI3 | YI3 | YI3 | YI3 | YI3 | YI3 | YI3 | YI3 | YI3 (E) |
| 4 | YI4 | YI4 | YI4 | YI4 | X | YI4 | YI4 | YI4 | YI4 | YI4 | YI4 | YI4 | YI4 | YI4 | YI4 | YI4 | YI4 | YI4 (E) |
| 5 | YI5 | YI5 | YI5 | YI5 | YI5 | X | YI5 | YI5 | YI5 | YI5 | YI5 | YI5 | YI5 | YI5 | YI5 | YI5 | YI5 | YI5 (E) |
| 6 | YI6 | YI6 | YI6 | YI6 | YI6 | YI6 | X | YI6 | YI6 | YI6 | YI6 | YI6 | YI6 | YI6 | YI6 | YI6 | YI6 | YI6 (E) |
| 7 | YI7 | YI7 | YI7 | YI7 | YI7 | YI7 | YI7 | X | YI7 | YI7 | YI7 | YI7 | YI7 | YI7 | YI7 | YI7 | YI7 | YI7 (E) |
| 8 | YI8 | YI8 | YI8 | YI8 | YI8 | YI8 | YI8 | YI8 | X | YI8 | YI8 | YI8 | YI8 | YI8 | YI8 | YI8 | YI8 | YI8 (E) |
| 9 | YI9 | YI9 | YI9 | YI9 | YI9 | YI9 | YI9 | YI9 | YI9 | X | YI9 | YI9 | YI9 | YI9 | YI9 | YI9 | YI9 | YI9 (E) |
| 10 | YI10 | YI10 | YI10 | YI10 | YI10 | YI10 | YI10 | YI10 | YI10 | YI10 | X | YI10 | YI10 | YI10 | YI10 | YI10 | YI10 | YI10 (E) |
| 11 | YI11 | YI11 | YI11 | YI11 | YI11 | YI11 | YI11 | YI11 | YI11 | YI11 | YI11 | X | YI11 | YI11 | YI11 | YI11 | YI11 | YI11 (E) |
| 12 | YI12 | YI12 | YI12 | YI12 | YI12 | YI12 | YI12 | YI12 | YI12 | YI12 | YI12 | YI12 | X | YI12 | YI12 | YI12 | YI12 | YI12 (E) |
| 13 | YI13 | YI13 | YI13 | YI13 | YI13 | YI13 | YI13 | YI13 | YI13 | YI13 | YI13 | YI13 | YI13 | X | YI13 | YI13 | YI13 | YI13 (E) |
| 14 | YI14 | YI14 | YI14 | YI14 | YI14 | YI14 | YI14 | YI14 | YI14 | YI14 | YI14 | YI14 | YI14 | YI14 | X | YI14 | YI14 | YI14 (E) |
| 15 | YI15 | YI15 | YI15 | YI15 | YI15 | YI15 | YI15 | YI15 | YI15 | YI15 | YI15 | YI15 | YI15 | YI15 | YI15 | X | YI15 | YI15 (E) |
| 16 | X | YI16 | YI16 | YI16 | YI16 | YI16 | YI16 | YI16 | YI16 | YI16 | YI16 | YI16 | YI16 | YI16 | YI16 | YI16 | YI16 | YI16 (E) |
| 17 | YI17 | X | YI17 | YI17 | YI17 | YI17 | YI17 | YI17 | YI17 | YI17 | YI17 | YI17 | YI17 | YI17 | YI17 | YI17 | YI17 | YI17 (E) |
| 18 | YI18 | YI18 | X | YI18 | YI18 | YI18 | YI18 | YI18 | YI18 | YI18 | YI18 | YI18 | YI18 | YI18 | YI18 | YI18 | YI18 | YI18 (E) |
| 19 | YI19 | YI19 | YI19 | X | YI19 | YI19 | YI19 | YI19 | YI19 | YI19 | YI19 | YI19 | YI19 | YI19 | YI19 | YI19 | YI19 | YI19 (E) |
| 20 | YI20 | YI20 | YI20 | YI20 | X | YI20 | YI20 | YI20 | YI20 | YI20 | YI20 | YI20 | YI20 | YI20 | YI20 | YI20 | YI20 | YI20 (E) |
| 21 | YI21 | YI21 | YI21 | YI21 | YI21 | X | YI21 | YI21 | YI21 | YI21 | YI21 | YI21 | YI21 | YI21 | YI21 | YI21 | YI21 | YI21 (E) |
| 22 | YI22 | YI22 | YI22 | YI22 | YI22 | YI22 | X | YI22 | YI22 | YI22 | YI22 | YI22 | YI22 | YI22 | YI22 | YI22 | YI22 | YI22 (E) |
| 23 | YI23 | YI23 | YI23 | YI23 | YI23 | YI23 | YI23 | X | YI23 | YI23 | YI23 | YI23 | YI23 | YI23 | YI23 | YI23 | YI23 | YI23 (E) |
| 24 | YI24 | YI24 | YI24 | YI24 | YI24 | YI24 | YI24 | YI24 | X | YI24 | YI24 | YI24 | YI24 | YI24 | YI24 | YI24 | YI24 | YI24 (E) |
| 25 | YI25 | YI25 | YI25 | YI25 | YI25 | YI25 | YI25 | YI25 | YI25 | X | YI25 | YI25 | YI25 | YI25 | YI25 | YI25 | YI25 | YI25 (E) |
| 26 | YI26 | YI26 | YI26 | YI26 | YI26 | YI26 | YI26 | YI26 | YI26 | YI26 | X | YI26 | YI26 | YI26 | YI26 | YI26 | YI26 | YI26 (E) |
| 27 | YI27 | YI27 | YI27 | YI27 | YI27 | YI27 | YI27 | YI27 | YI27 | YI27 | YI27 | X | YI27 | YI27 | YI27 | YI27 | YI27 | YI27 (E) |
| 28 | YI28 | YI28 | YI28 | YI28 | YI28 | YI28 | YI28 | YI28 | YI28 | YI28 | YI28 | YI28 | X | YI28 | YI28 | YI28 | YI28 | YI28 (E) |
| 29 | YI29 | YI29 | YI29 | YI29 | YI29 | YI29 | YI29 | YI29 | YI29 | YI29 | YI29 | YI29 | YI29 | X | YI29 | YI29 | YI29 | YI29 (E) |
| 30 | YI30 | YI30 | YI30 | YI30 | YI30 | YI30 | YI30 | YI30 | YI30 | YI30 | YI30 | YI30 | YI30 | YI30 | X | YI30 | YI30 | YI30 (E) |
| 31 | YI31 | YI31 | YI31 | YI31 | YI31 | YI31 | YI31 | YI31 | YI31 | YI31 | YI31 | YI31 | YI31 | YI31 | YI31 | X | YI31 | YI31 (E) |

FIG. 12B

| C_ADD | 1010_0 | 1010_1 | 1010_2 | 1010_3 | 1010_4 | 1010_5 | 1010_6 | 1010_7 | 1010_8 | 1010_9 | 1010_10 | 1010_11 | 1010_12 | 1010_13 | 1010_14 | 1010_15 | 1010_16 | 1010_17 |
|---|---|---|---|---|---|---|---|---|---|---|---|---|---|---|---|---|---|---|
| 32 | X | YI32 | YI32 | YI32 | YI32 | YI32 | YI32 | YI32 | YI32 | YI32 | YI32 | YI32 | YI32 | YI32 | YI32 | YI32 | YI32 | YI32 (E) |
| 33 | YI33 | X | YI33 | YI33 | YI33 | YI33 | YI33 | YI33 | YI33 | YI33 | YI33 | YI33 | YI33 | YI33 | YI33 | YI33 | YI33 | YI33 (E) |
| 34 | YI34 | YI34 | X | YI34 | YI34 | YI34 | YI34 | YI34 | YI34 | YI34 | YI34 | YI34 | YI34 | YI34 | YI34 | YI34 | YI34 | YI34 (E) |
| 35 | YI35 | YI35 | YI35 | X | YI35 | YI35 | YI35 | YI35 | YI35 | YI35 | YI35 | YI35 | YI35 | YI35 | YI35 | YI35 | YI35 | YI35 (E) |
| 36 | YI36 | YI36 | YI36 | YI36 | X | YI36 | YI36 | YI36 | YI36 | YI36 | YI36 | YI36 | YI36 | YI36 | YI36 | YI36 | YI36 | YI36 (E) |
| 37 | YI37 | YI37 | YI37 | YI37 | YI37 | X | YI37 | YI37 | YI37 | YI37 | YI37 | YI37 | YI37 | YI37 | YI37 | YI37 | YI37 | YI37 (E) |
| 38 | YI38 | YI38 | YI38 | YI38 | YI38 | YI38 | X | YI38 | YI38 | YI38 | YI38 | YI38 | YI38 | YI38 | YI38 | YI38 | YI38 | YI38 (E) |
| 39 | YI39 | YI39 | YI39 | YI39 | YI39 | YI39 | YI39 | X | YI39 | YI39 | YI39 | YI39 | YI39 | YI39 | YI39 | YI39 | YI39 | YI39 (E) |
| 40 | YI40 | YI40 | YI40 | YI40 | YI40 | YI40 | YI40 | YI40 | X | YI40 | YI40 | YI40 | YI40 | YI40 | YI40 | YI40 | YI40 | YI40 (E) |
| 41 | YI41 | YI41 | YI41 | YI41 | YI41 | YI41 | YI41 | YI41 | YI41 | X | YI41 | YI41 | YI41 | YI41 | YI41 | YI41 | YI41 | YI41 (E) |
| 42 | YI42 | YI42 | YI42 | YI42 | YI42 | YI42 | YI42 | YI42 | YI42 | YI42 | X | YI42 | YI42 | YI42 | YI42 | YI42 | YI42 | YI42 (E) |
| 43 | YI43 | YI43 | YI43 | YI43 | YI43 | YI43 | YI43 | YI43 | YI43 | YI43 | YI43 | X | YI43 | YI43 | YI43 | YI43 | YI43 | YI43 (E) |
| 44 | YI44 | YI44 | YI44 | YI44 | YI44 | YI44 | YI44 | YI44 | YI44 | YI44 | YI44 | YI44 | X | YI44 | YI44 | YI44 | YI44 | YI44 (E) |
| 45 | YI45 | YI45 | YI45 | YI45 | YI45 | YI45 | YI45 | YI45 | YI45 | YI45 | YI45 | YI45 | YI45 | X | YI45 | YI45 | YI45 | YI45 (E) |
| 46 | YI46 | YI46 | YI46 | YI46 | YI46 | YI46 | YI46 | YI46 | YI46 | YI46 | YI46 | YI46 | YI46 | YI46 | X | YI46 | YI46 | YI46 (E) |
| 47 | YI47 | YI47 | YI47 | YI47 | YI47 | YI47 | YI47 | YI47 | YI47 | YI47 | YI47 | YI47 | YI47 | YI47 | YI47 | X | YI47 | YI47 (E) |
| 48 | X | YI48 | YI48 | YI48 | YI48 | YI48 | YI48 | YI48 | YI48 | YI48 | YI48 | YI48 | YI48 | YI48 | YI48 | YI48 | YI48 | YI48 (E) |
| 49 | YI49 | X | YI49 | YI49 | YI49 | YI49 | YI49 | YI49 | YI49 | YI49 | YI49 | YI49 | YI49 | YI49 | YI49 | YI49 | YI49 | YI49 (E) |
| 50 | YI50 | YI50 | X | YI50 | YI50 | YI50 | YI50 | YI50 | YI50 | YI50 | YI50 | YI50 | YI50 | YI50 | YI50 | YI50 | YI50 | YI50 (E) |
| 51 | YI51 | YI51 | YI51 | X | YI51 | YI51 | YI51 | YI51 | YI51 | YI51 | YI51 | YI51 | YI51 | YI51 | YI51 | YI51 | YI51 | YI51 (E) |
| 52 | YI52 | YI52 | YI52 | YI52 | X | YI52 | YI52 | YI52 | YI52 | YI52 | YI52 | YI52 | YI52 | YI52 | YI52 | YI52 | YI52 | YI52 (E) |
| 53 | YI53 | YI53 | YI53 | YI53 | YI53 | X | YI53 | YI53 | YI53 | YI53 | YI53 | YI53 | YI53 | YI53 | YI53 | YI53 | YI53 | YI53 (E) |
| 54 | YI54 | YI54 | YI54 | YI54 | YI54 | YI54 | X | YI54 | YI54 | YI54 | YI54 | YI54 | YI54 | YI54 | YI54 | YI54 | YI54 | YI54 (E) |
| 55 | YI55 | YI55 | YI55 | YI55 | YI55 | YI55 | YI55 | X | YI55 | YI55 | YI55 | YI55 | YI55 | YI55 | YI55 | YI55 | YI55 | YI55 (E) |
| 56 | YI56 | YI56 | YI56 | YI56 | YI56 | YI56 | YI56 | YI56 | X | YI56 | YI56 | YI56 | YI56 | YI56 | YI56 | YI56 | YI56 | YI56 (E) |
| 57 | YI57 | YI57 | YI57 | YI57 | YI57 | YI57 | YI57 | YI57 | YI57 | X | YI57 | YI57 | YI57 | YI57 | YI57 | YI57 | YI57 | YI57 (E) |
| 58 | YI58 | YI58 | YI58 | YI58 | YI58 | YI58 | YI58 | YI58 | YI58 | YI58 | X | YI58 | YI58 | YI58 | YI58 | YI58 | YI58 | YI58 (E) |
| 59 | YI59 | YI59 | YI59 | YI59 | YI59 | YI59 | YI59 | YI59 | YI59 | YI59 | YI59 | X | YI59 | YI59 | YI59 | YI59 | YI59 | YI59 (E) |
| 60 | YI60 | YI60 | YI60 | YI60 | YI60 | YI60 | YI60 | YI60 | YI60 | YI60 | YI60 | YI60 | X | YI60 | YI60 | YI60 | YI60 | YI60 (E) |
| 61 | YI61 | YI61 | YI61 | YI61 | YI61 | YI61 | YI61 | YI61 | YI61 | YI61 | YI61 | YI61 | YI61 | X | YI61 | YI61 | YI61 | YI61 (E) |
| 62 | YI62 | YI62 | YI62 | YI62 | YI62 | YI62 | YI62 | YI62 | YI62 | YI62 | YI62 | YI62 | YI62 | YI62 | X | YI62 | YI62 | YI62 (E) |
| 63 | YI63 | YI63 | YI63 | YI63 | YI63 | YI63 | YI63 | YI63 | YI63 | YI63 | YI63 | YI63 | YI63 | YI63 | YI63 | X | YI63 | YI63 (E) |

FIG. 12C

| C_ADD | 1010_0 | 1010_1 | 1010_2 | 1010_3 | 1010_4 | 1010_5 | 1010_6 | 1010_7 | 1010_8 | 1010_9 | 1010_10 | 1010_11 | 1010_12 | 1010_13 | 1010_14 | 1010_15 | 1010_16 | 1010_17 |
|---|---|---|---|---|---|---|---|---|---|---|---|---|---|---|---|---|---|---|
| 64 | X | Y164 | Y164 | Y164 | Y164 | Y164 | Y164 | Y164 | Y164 | Y164 | Y164 | Y164 | Y164 | Y164 | Y164 | Y164 | Y164 | Y164 (E) |
| 65 | Y165 | X | Y165 | Y165 | Y165 | Y165 | Y165 | Y165 | Y165 | Y165 | Y165 | Y165 | Y165 | Y165 | Y165 | Y165 | Y165 | Y165 (E) |
| 66 | Y166 | Y166 | X | Y166 | Y166 | Y166 | Y166 | Y166 | Y166 | Y166 | Y166 | Y166 | Y166 | Y166 | Y166 | Y166 | Y166 | Y166 (E) |
| 67 | Y167 | Y167 | Y167 | X | Y167 | Y167 | Y167 | Y167 | Y167 | Y167 | Y167 | Y167 | Y167 | Y167 | Y167 | Y167 | Y167 | Y167 (E) |
| 68 | Y168 | Y168 | Y168 | Y168 | X | Y168 | Y168 | Y168 | Y168 | Y168 | Y168 | Y168 | Y168 | Y168 | Y168 | Y168 | Y168 | Y168 (E) |
| 69 | Y169 | Y169 | Y169 | Y169 | Y169 | X | Y169 | Y169 | Y169 | Y169 | Y169 | Y169 | Y169 | Y169 | Y169 | Y169 | Y169 | Y169 (E) |
| 70 | Y170 | Y170 | Y170 | Y170 | Y170 | Y170 | X | Y170 | Y170 | Y170 | Y170 | Y170 | Y170 | Y170 | Y170 | Y170 | Y170 | Y170 (E) |
| 71 | Y171 | Y171 | Y171 | Y171 | Y171 | Y171 | Y171 | X | Y171 | Y171 | Y171 | Y171 | Y171 | Y171 | Y171 | Y171 | Y171 | Y171 (E) |
| 72 | Y172 | Y172 | Y172 | Y172 | Y172 | Y172 | Y172 | Y172 | X | Y172 | Y172 | Y172 | Y172 | Y172 | Y172 | Y172 | Y172 | Y172 (E) |
| 73 | Y173 | Y173 | Y173 | Y173 | Y173 | Y173 | Y173 | Y173 | Y173 | X | Y173 | Y173 | Y173 | Y173 | Y173 | Y173 | Y173 | Y173 (E) |
| 74 | Y174 | Y174 | Y174 | Y174 | Y174 | Y174 | Y174 | Y174 | Y174 | Y174 | X | Y174 | Y174 | Y174 | Y174 | Y174 | Y174 | Y174 (E) |
| 75 | Y175 | Y175 | Y175 | Y175 | Y175 | Y175 | Y175 | Y175 | Y175 | Y175 | Y175 | X | Y175 | Y175 | Y175 | Y175 | Y175 | Y175 (E) |
| 76 | Y176 | Y176 | Y176 | Y176 | Y176 | Y176 | Y176 | Y176 | Y176 | Y176 | Y176 | Y176 | X | Y176 | Y176 | Y176 | Y176 | Y176 (E) |
| 77 | Y177 | Y177 | Y177 | Y177 | Y177 | Y177 | Y177 | Y177 | Y177 | Y177 | Y177 | Y177 | Y177 | X | Y177 | Y177 | Y177 | Y177 (E) |
| 78 | Y178 | Y178 | Y178 | Y178 | Y178 | Y178 | Y178 | Y178 | Y178 | Y178 | Y178 | Y178 | Y178 | Y178 | X | Y178 | Y178 | Y178 (E) |
| 79 | Y179 | Y179 | Y179 | Y179 | Y179 | Y179 | Y179 | Y179 | Y179 | Y179 | Y179 | Y179 | Y179 | Y179 | Y179 | X | Y179 | Y179 (E) |
| 80 | X | Y180 | Y180 | Y180 | Y180 | Y180 | Y180 | Y180 | Y180 | Y180 | Y180 | Y180 | Y180 | Y180 | Y180 | Y180 | Y180 | Y180 (E) |
| 81 | Y181 | X | Y181 | Y181 | Y181 | Y181 | Y181 | Y181 | Y181 | Y181 | Y181 | Y181 | Y181 | Y181 | Y181 | Y181 | Y181 | Y181 (E) |
| 82 | Y182 | Y182 | X | Y182 | Y182 | Y182 | Y182 | Y182 | Y182 | Y182 | Y182 | Y182 | Y182 | Y182 | Y182 | Y182 | Y182 | Y182 (E) |
| 83 | Y183 | Y183 | Y183 | X | Y183 | Y183 | Y183 | Y183 | Y183 | Y183 | Y183 | Y183 | Y183 | Y183 | Y183 | Y183 | Y183 | Y183 (E) |
| 84 | Y184 | Y184 | Y184 | Y184 | X | Y184 | Y184 | Y184 | Y184 | Y184 | Y184 | Y184 | Y184 | Y184 | Y184 | Y184 | Y184 | Y184 (E) |
| 85 | Y185 | Y185 | Y185 | Y185 | Y185 | X | Y185 | Y185 | Y185 | Y185 | Y185 | Y185 | Y185 | Y185 | Y185 | Y185 | Y185 | Y185 (E) |
| 86 | Y186 | Y186 | Y186 | Y186 | Y186 | Y186 | X | Y186 | Y186 | Y186 | Y186 | Y186 | Y186 | Y186 | Y186 | Y186 | Y186 | Y186 (E) |
| 87 | Y187 | Y187 | Y187 | Y187 | Y187 | Y187 | Y187 | X | Y187 | Y187 | Y187 | Y187 | Y187 | Y187 | Y187 | Y187 | Y187 | Y187 (E) |
| 88 | Y188 | Y188 | Y188 | Y188 | Y188 | Y188 | Y188 | Y188 | X | Y188 | Y188 | Y188 | Y188 | Y188 | Y188 | Y188 | Y188 | Y188 (E) |
| 89 | Y189 | Y189 | Y189 | Y189 | Y189 | Y189 | Y189 | Y189 | Y189 | X | Y189 | Y189 | Y189 | Y189 | Y189 | Y189 | Y189 | Y189 (E) |
| 90 | Y190 | Y190 | Y190 | Y190 | Y190 | Y190 | Y190 | Y190 | Y190 | Y190 | X | Y190 | Y190 | Y190 | Y190 | Y190 | Y190 | Y190 (E) |
| 91 | Y191 | Y191 | Y191 | Y191 | Y191 | Y191 | Y191 | Y191 | Y191 | Y191 | Y191 | X | Y191 | Y191 | Y191 | Y191 | Y191 | Y191 (E) |
| 92 | Y192 | Y192 | Y192 | Y192 | Y192 | Y192 | Y192 | Y192 | Y192 | Y192 | Y192 | Y192 | X | Y192 | Y192 | Y192 | Y192 | Y192 (E) |
| 93 | Y193 | Y193 | Y193 | Y193 | Y193 | Y193 | Y193 | Y193 | Y193 | Y193 | Y193 | Y193 | Y193 | X | Y193 | Y193 | Y193 | Y193 (E) |
| 94 | Y194 | Y194 | Y194 | Y194 | Y194 | Y194 | Y194 | Y194 | Y194 | Y194 | Y194 | Y194 | Y194 | Y194 | X | Y194 | Y194 | Y194 (E) |
| 95 | Y195 | Y195 | Y195 | Y195 | Y195 | Y195 | Y195 | Y195 | Y195 | Y195 | Y195 | Y195 | Y195 | Y195 | Y195 | X | Y195 | Y195 (E) |

FIG. 12D

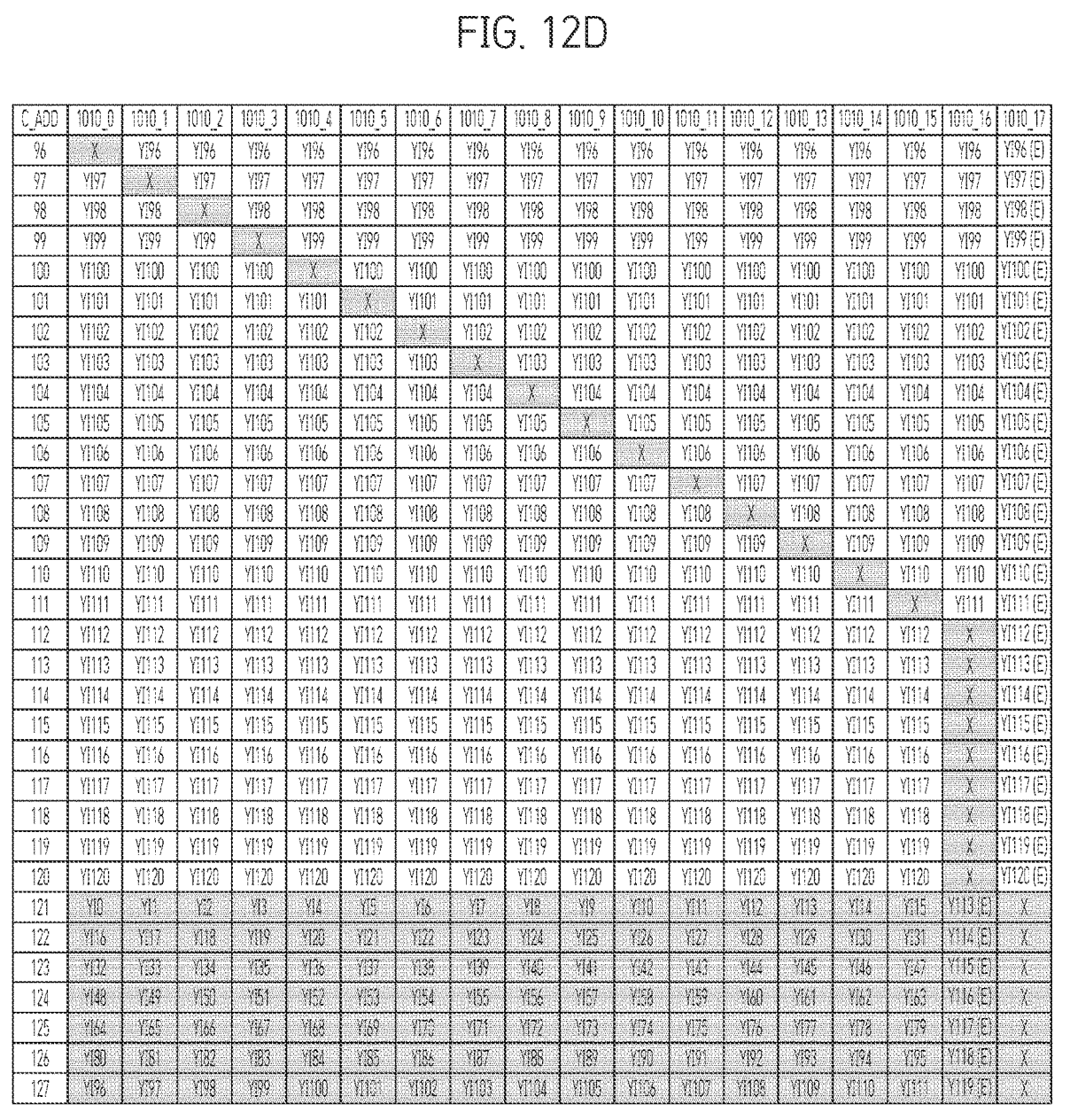

| C_ADD | 1010_0 | 1010_1 | 1010_2 | 1010_3 | 1010_4 | 1010_5 | 1010_6 | 1010_7 | 1010_8 | 1010_9 | 1010_10 | 1010_11 | 1010_12 | 1010_13 | 1010_14 | 1010_15 | 1010_16 | 1010_17 |
|---|---|---|---|---|---|---|---|---|---|---|---|---|---|---|---|---|---|---|
| 96 | X | YI96 | YI96 | YI96 | YI96 | YI96 | YI96 | YI96 | YI96 | YI96 | YI96 | YI96 | YI96 | YI96 | YI96 | YI96 | YI96 | YI96 (E) |
| 97 | YI97 | X | YI97 | YI97 | YI97 | YI97 | YI97 | YI97 | YI97 | YI97 | YI97 | YI97 | YI97 | YI97 | YI97 | YI97 | YI97 | YI97 (E) |
| 98 | YI98 | YI98 | X | YI98 | YI98 | YI98 | YI98 | YI98 | YI98 | YI98 | YI98 | YI98 | YI98 | YI98 | YI98 | YI98 | YI98 | YI98 (E) |
| 99 | YI99 | YI99 | YI99 | X | YI99 | YI99 | YI99 | YI99 | YI99 | YI99 | YI99 | YI99 | YI99 | YI99 | YI99 | YI99 | YI99 | YI99 (E) |
| 100 | YI100 | YI100 | YI100 | YI100 | X | YI100 | YI100 | YI100 | YI100 | YI100 | YI100 | YI100 | YI100 | YI100 | YI100 | YI100 | YI100 | YI100 (E) |
| 101 | YI101 | YI101 | YI101 | YI101 | YI101 | X | YI101 | YI101 | YI101 | YI101 | YI101 | YI101 | YI101 | YI101 | YI101 | YI101 | YI101 | YI101 (E) |
| 102 | YI102 | YI102 | YI102 | YI102 | YI102 | YI102 | X | YI102 | YI102 | YI102 | YI102 | YI102 | YI102 | YI102 | YI102 | YI102 | YI102 | YI102 (E) |
| 103 | YI103 | YI103 | YI103 | YI103 | YI103 | YI103 | YI103 | X | YI103 | YI103 | YI103 | YI103 | YI103 | YI103 | YI103 | YI103 | YI103 | YI103 (E) |
| 104 | YI104 | YI104 | YI104 | YI104 | YI104 | YI104 | YI104 | YI104 | X | YI104 | YI104 | YI104 | YI104 | YI104 | YI104 | YI104 | YI104 | YI104 (E) |
| 105 | YI105 | YI105 | YI105 | YI105 | YI105 | YI105 | YI105 | YI105 | YI105 | X | YI105 | YI105 | YI105 | YI105 | YI105 | YI105 | YI105 | YI105 (E) |
| 106 | YI106 | YI106 | YI106 | YI106 | YI106 | YI106 | YI106 | YI106 | YI106 | YI106 | X | YI106 | YI106 | YI106 | YI106 | YI106 | YI106 | YI106 (E) |
| 107 | YI107 | YI107 | YI107 | YI107 | YI107 | YI107 | YI107 | YI107 | YI107 | YI107 | YI107 | X | YI107 | YI107 | YI107 | YI107 | YI107 | YI107 (E) |
| 108 | YI108 | YI108 | YI108 | YI108 | YI108 | YI108 | YI108 | YI108 | YI108 | YI108 | YI108 | YI108 | X | YI108 | YI108 | YI108 | YI108 | YI108 (E) |
| 109 | YI109 | YI109 | YI109 | YI109 | YI109 | YI109 | YI109 | YI109 | YI109 | YI109 | YI109 | YI109 | YI109 | X | YI109 | YI109 | YI109 | YI109 (E) |
| 110 | YI110 | YI110 | YI110 | YI110 | YI110 | YI110 | YI110 | YI110 | YI110 | YI110 | YI110 | YI110 | YI110 | YI110 | X | YI110 | YI110 | YI110 (E) |
| 111 | YI111 | YI111 | YI111 | YI111 | YI111 | YI111 | YI111 | YI111 | YI111 | YI111 | YI111 | YI111 | YI111 | YI111 | YI111 | X | YI111 | YI111 (E) |
| 112 | YI112 | YI112 | YI112 | YI112 | YI112 | YI112 | YI112 | YI112 | YI112 | YI112 | YI112 | YI112 | YI112 | YI112 | YI112 | YI112 | X | YI112 (E) |
| 113 | YI113 | YI113 | YI113 | YI113 | YI113 | YI113 | YI113 | YI113 | YI113 | YI113 | YI113 | YI113 | YI113 | YI113 | YI113 | YI113 | X | YI113 (E) |
| 114 | YI114 | YI114 | YI114 | YI114 | YI114 | YI114 | YI114 | YI114 | YI114 | YI114 | YI114 | YI114 | YI114 | YI114 | YI114 | YI114 | X | YI114 (E) |
| 115 | YI115 | YI115 | YI115 | YI115 | YI115 | YI115 | YI115 | YI115 | YI115 | YI115 | YI115 | YI115 | YI115 | YI115 | YI115 | YI115 | X | YI115 (E) |
| 116 | YI116 | YI116 | YI116 | YI116 | YI116 | YI116 | YI116 | YI116 | YI116 | YI116 | YI116 | YI116 | YI116 | YI116 | YI116 | YI116 | X | YI116 (E) |
| 117 | YI117 | YI117 | YI117 | YI117 | YI117 | YI117 | YI117 | YI117 | YI117 | YI117 | YI117 | YI117 | YI117 | YI117 | YI117 | YI117 | X | YI117 (E) |
| 118 | YI118 | YI118 | YI118 | YI118 | YI118 | YI118 | YI118 | YI118 | YI118 | YI118 | YI118 | YI118 | YI118 | YI118 | YI118 | YI118 | X | YI118 (E) |
| 119 | YI119 | YI119 | YI119 | YI119 | YI119 | YI119 | YI119 | YI119 | YI119 | YI119 | YI119 | YI119 | YI119 | YI119 | YI119 | YI119 | X | YI119 (E) |
| 120 | YI120 | YI120 | YI120 | YI120 | YI120 | YI120 | YI120 | YI120 | YI120 | YI120 | YI120 | YI120 | YI120 | YI120 | YI120 | YI120 | X | YI120 (E) |
| 121 | YI0 | YI1 | YI2 | YI3 | YI4 | YI5 | YI6 | YI7 | YI8 | YI9 | YI10 | YI11 | YI12 | YI13 | YI14 | YI15 | YI113 (E) | X |
| 122 | YI16 | YI17 | YI18 | YI19 | YI20 | YI21 | YI22 | YI23 | YI24 | YI25 | YI26 | YI27 | YI28 | YI29 | YI30 | YI31 | YI114 (E) | X |
| 123 | YI32 | YI33 | YI34 | YI35 | YI36 | YI37 | YI38 | YI39 | YI40 | YI41 | YI42 | YI43 | YI44 | YI45 | YI46 | YI47 | YI115 (E) | X |
| 124 | YI48 | YI49 | YI50 | YI51 | YI52 | YI53 | YI54 | YI55 | YI56 | YI57 | YI58 | YI59 | YI60 | YI61 | YI62 | YI63 | YI116 (E) | X |
| 125 | YI64 | YI65 | YI66 | YI67 | YI68 | YI69 | YI70 | YI71 | YI72 | YI73 | YI74 | YI75 | YI76 | YI77 | YI78 | YI79 | YI117 (E) | X |
| 126 | YI80 | YI81 | YI82 | YI83 | YI84 | YI85 | YI86 | YI87 | YI88 | YI89 | YI90 | YI91 | YI92 | YI93 | YI94 | YI95 | YI118 (E) | X |
| 127 | YI96 | YI97 | YI98 | YI99 | YI100 | YI101 | YI102 | YI103 | YI104 | YI105 | YI106 | YI107 | YI108 | YI109 | YI110 | YI111 | YI119 (E) | X |

MEMORY STORING METADATA AND MEMORY SYSTEM

CROSS-REFERENCE TO RELATED APPLICATIONS

This application claims priority under 35 U.S.C. § 119 to Korean Patent Application Nos. 10-2023-0060666 filed on May 10, 2023, 10-2023-0060667 filed on May 10, 2023, 10-2023-0060668 filed on May 10, 2023, and 10-2023-0189143 filed on Dec. 22, 2023, which are incorporated herein by reference in their entireties.

BACKGROUND

1. Technical Field

Embodiments of the present disclosure relate to a memory that stores metadata along with user data.

2. Related Art

As applications which use artificial intelligence and big data have recently increased, the amount of data to be processed is explosively increased. Many computer systems (e.g., a data center and a server) require high-capacity memory, and applications using the computer systems require memories having a higher capacity than the computer systems may have. Furthermore, as the amount of data is increased, the importance of metadata that are used for data management gradually increases.

Accordingly, there is a need for a scheme for storing metadata in a memory in an efficient way in addition to user data.

SUMMARY

In an embodiment of the present disclosure, a memory may include a data transmission/reception circuit and a memory bank including a plurality of cell arrays. When a metadata mode is activated, data and metadata received through the data transmission/reception circuit may be distributed to and stored in the plurality of cell arrays. When the metadata mode is deactivated, the data received through the data transmission/reception circuit may be distributed to and stored in cell arrays except one or more no-access cell arrays, among the plurality of cell arrays.

In an embodiment of the present disclosure, a memory may include a data transmission/reception circuit, an ECC engine, and a memory bank including a plurality of cell arrays. The ECC engine may generate an error correction code by using data and metadata received through the data transmission/reception circuit when a metadata mode is activated, and may generate the error correction code by using the data received through the data transmission/reception circuit when the metadata mode is deactivated. When the metadata mode is activated, the data, the metadata, and the error correction code may be distributed to and stored in the plurality of cell arrays. When the metadata mode is deactivated, the data and the error correction code may be distributed to and stored in cell arrays except one or more no-access cell arrays, among the plurality of cell arrays.

In an embodiment of the present disclosure, a memory system may include a memory in which the number of cases of a column address that is accessible is changed depending on a set mode and a memory controller configured to control the memory. The memory controller may include an address conversion circuit configured to convert a system address into a memory address for accessing the memory. The system address may be converted into the memory address according to a method that is changed depending on the set mode.

BRIEF DESCRIPTION OF THE DRAWINGS

FIG. 7 is a diagram for describing read and write operations of the memory bank in FIG. 5 based on the value of a column address when a metadata mode of the memory in FIG. 4 is activated, according to an embodiment of the present disclosure.

FIGS. 8A to 8D are diagrams for describing read and write operations of the memory bank in FIG. 5 based on the value of the column address when the metadata mode of the memory in FIG. 4 is deactivated, according to an embodiment of the present disclosure.

FIG. 11 is a diagram for describing read and write operations of the memory bank in FIG. 10 based on the value of the column address when the metadata mode of the memory in FIG. 9 is activated, according to an embodiment of the present disclosure.

FIGS. 12A to 12D are diagrams for describing read and write operations of the memory bank in FIG. 10 based on the value of the column address when the metadata mode of the memory in FIG. 9 is deactivated, according to an embodiment of the present disclosure.

DETAILED DESCRIPTION

Hereinafter, embodiments according to the technical spirit of the present disclosure are described with reference to the accompanying drawings.

Embodiments of the present disclosure may provide a method of efficiently storing metadata in memory.

According to embodiments of the present disclosure, it is possible to efficiently store metadata in memory and to minimize an increase in the area of a memory to support storing metadata.

Figure 1:
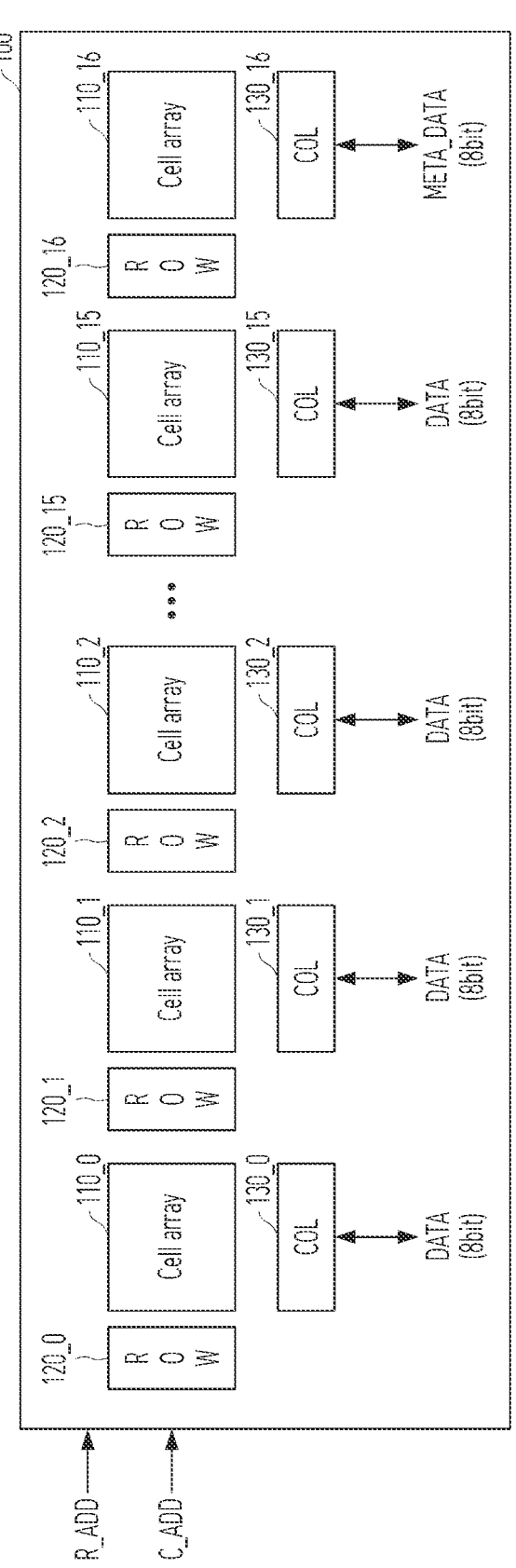
FIG. 1 is a diagram illustrating a configuration of a memory bank storing data therein included in a memory according to an embodiment of the present disclosure.

FIG. 1 is a diagram illustrating a configuration of a memory bank 100 storing data therein included in a memory according to an embodiment of the present disclosure.

Referring to FIG. 1, a memory bank 100 may include cell arrays 110_0 to 110_16, row circuits (ROW) 120_0 to 120_16, and column circuits (COL) 130_0 to 130_16.

Each of the cell arrays 110_0 to 110_16 may include multiple memory cells that are arranged in multiple rows and multiple columns.

The row circuits 120_0 to 120_16 may perform an active operation of activating a row that has been selected by a row address R_ADD, among the multiple rows of the cell arrays 110_0 to 110_16. For example, the row circuit 120_0 may activate a row that has been selected by the row address R_ADD in the cell array 110_0 after the start of an active operation. The row circuit 120_3 may activate a row that has been selected by the row address R_ADD in the cell array 110_3 after the start of an active operation. During the active operation, the data of memory cells in the selected row may be sensed and amplified.

The column circuits 130_0 to 130_16 may write data into memory cells in columns that have been selected by the column address C_ADD, among the columns of a row that has been selected by the row circuits 120_0 to 120_16 in the cell arrays 110_0 to 110_16, or may read data from the memory cells in the selected columns. That is, the column circuits 130_0 to 130_16 may perform an operation of reading data from or writing data into the memory cells corresponding to the selected row and selected columns in the cell arrays 110_0 to 110_16. For example, the column circuit 130_1 may write data into or read data from memory cells in columns that have been selected by the column address C_ADD in a row that has been selected by the row circuit 120_1 in the cell array 110_1.

After the start of read and write operations of the memory bank 100, data (i.e., user data) and metadata may be distributed to and stored in the cell arrays 110_0 to 110_16. For example, 128-bit data DATA may be distributed to and stored in the 16 cell arrays 110_0 to 110_15 by 8 bits. 8-bit metadata META_DATA may be stored in the cell array 110_16.

Metadata may be used and might not be used depending on a memory system including memory. If the metadata are used in the memory system, all of the cell arrays 110_0 to 110_16 of the memory bank 100 may be used. If the metadata are not used in the memory system, however, only the cell arrays 110_0 to 110_15 of the memory bank 100 may be used, and the cell array 110_16 might not be used. In this case, only the size of the memory may be unnecessarily increased, which may waste the region of the memory.

Figure 2:
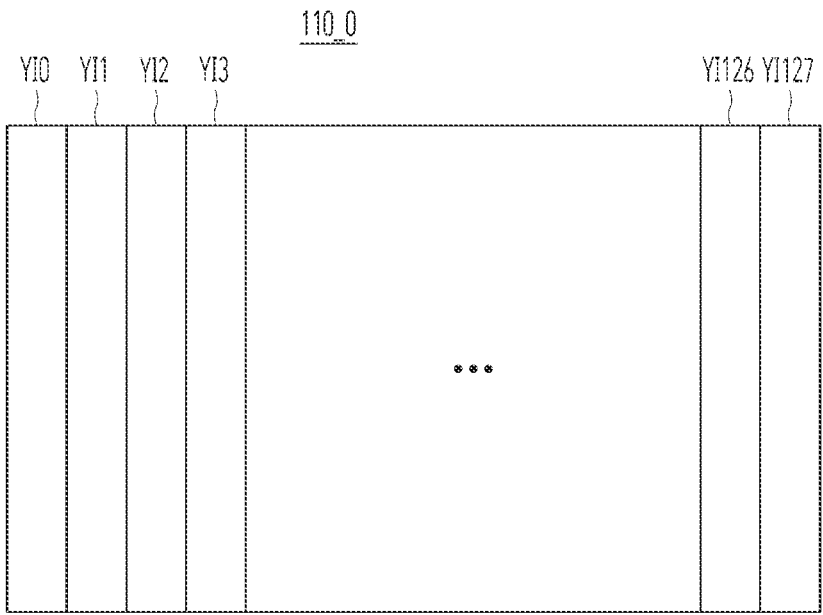
FIG. 2 is a diagram illustrating a configuration of columns of a cell array in FIG. 1, according to an embodiment of the present disclosure.

FIG. 2 is a diagram illustrating a configuration of a construction of columns of the cell array 110_0 in FIG. 1, according to an embodiment of the present disclosure.

Referring to FIG. 2, column selection signals YI0 to YI127 may be signals that are used to select the columns in the cell array 110_0. After the start of read and write operations, one of the column selection signals YI0 to YI127 may be activated, and 8 columns corresponding to the activated column selection signal may be accessed. For example, when the column selection signal YI14 is activated in the state in which a No. 78 row has been activated (or selected), eight memory cells corresponding to the column selection signal YI14 in the No. 78 row of the cell array 110_0 may be accessed.

The column selection signals YI0 to YI127 may be generated by the column circuit 130_0. A column selection signal to be activated, among the column selection signals YI0 to YI127, may be selected based on the value of the column address C_ADD.

Figure 3:
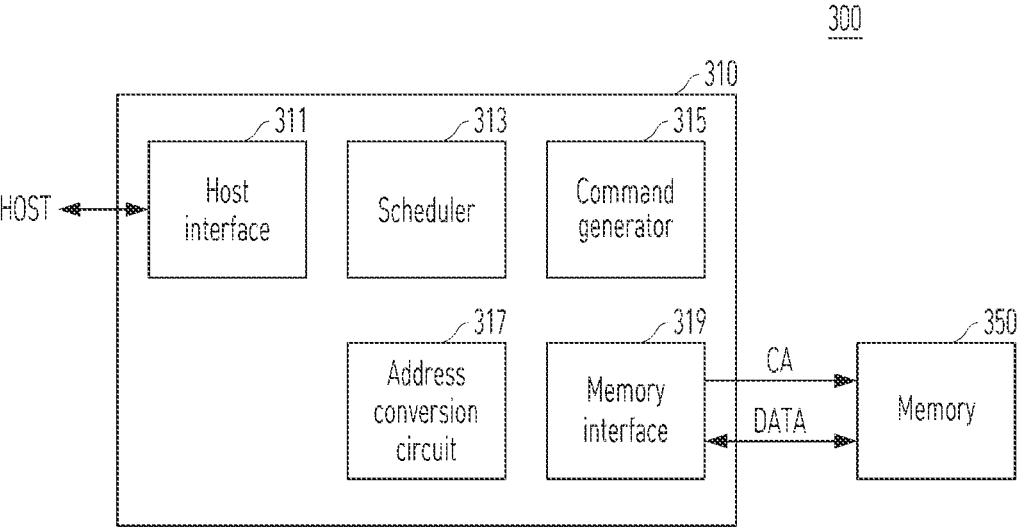
FIG. 3 is a diagram illustrating a configuration of a memory system according to an embodiment of the present disclosure.

FIG. 3 is a diagram illustrating a configuration of a memory system 300 according to an embodiment of the present disclosure.

Referring to FIG. 3, the memory system 300 may include a memory controller 310 and a memory 350.

The memory controller 310 may control an operation of the memory 350 based on a request from a host HOST. The host HOST may include a central processing unit (CPU), a graphic processing unit (GPU), and an application processor (AP). The memory controller 310 may include a host interface 311, a scheduler 313, a command generator 315, an address conversion circuit 317, and a memory interface 319.

The host interface 311 may be an interface between the memory controller 310 and the host HOST.

The scheduler 313 may determine the sequence of a request to be made to the memory 350, among requests from the host HOST. The scheduler 313 may make different the sequence of requests that have been received from the host HOST and the sequence of operations to be instructed to the memory 150 in order to improve performance of the memory 350. For example, although the host HOST has first requested a read operation from the memory 150 and then requested a write operation to the memory 150, the scheduler 313 may adjust the sequence of the read and write operations so that the write operation is performed prior to the read operation.

The command generator 315 may generate a command to be applied to the memory 350 according to the sequence of operations that has been determined by the scheduler 313.

The address conversion circuit 317 may convert an address, which has been received from the host HOST, into a memory address for accessing the memory 350. The address conversion method of the address conversion circuit 317 may be different depending on a set mode. In this case, being different depending on the set mode may mean that the address conversion method is different when a metadata mode is activated, wherein metadata are stored in the memory 350, and when the metadata mode is deactivated, wherein metadata are not stored in the memory 350.

The memory address may include a bank address, a row address, and a column address. The bank address may be an address for selecting a memory bank to be accessed in the memory 350. The row address may be an address for selecting a row to be accessed in a selected memory bank. The column address may be an address for selecting columns to be accessed within a selected row in a selected memory bank. In terms of the system of the memory address, the bank address, among the bank address, the row address, and the column address, may be the highest address, the row address may be a middle address, and the column address may be a lower address.

In the memory 350, the number of cases of a column address value that is accessible may be different depending on whether the metadata mode is activated. For example, when the metadata mode is activated in the memory 350, the number of cases of a column address value that is accessible in the memory 350 may be N (e.g., 121), where N is an integer equal to or greater than 2. When the metadata mode is deactivated in the memory 350, the number of cases of a column address value that is accessible in the memory 350 may be M (e.g., 128), where M is an integer greater than N.

When the metadata mode is activated, the address conversion circuit 317 may convert a quotient that is obtained by dividing the value of a system address by N into a bank address and a row address, and may convert the remainder into a column address. Furthermore, when the metadata mode is deactivated, the address conversion circuit 317 may convert a quotient that is obtained by dividing the value of a system address by M into a bank address and an address, and may convert the remainder into a column address. The reason for this is that the number of cases of a column address value which may be selected is different depending on whether the metadata mode is activated.

The memory interface 319 may be an interface between the memory controller 310 and the memory 350. A command/address CA may be transmitted from the memory controller 310 to the memory 350 through the memory interface 319. Data DATA may be transmitted and received between the memory controller 310 and the memory 350 through the memory interface 319. The data DATA may include metadata corresponding to data (i.e., user data) in addition to the user data. The memory interface 319 may also be called a PHY interface.

The memory 350 may perform operations that are instructed by the memory controller 310. The operations that are instructed by the memory controller 310 may include an active operation, a precharge operation, a read operation, a write operation, and a refresh operation. When the metadata mode is activated, data and metadata may be written into the memory 350 after the start of a write operation, and data and metadata may be read from the memory 350 after the start of a read operation. As described above, the number of cases of a column address value that is accessible in the memory 350, that is, the number of accessible columns, may be different depending on whether the metadata mode is activated.

Figure 4:
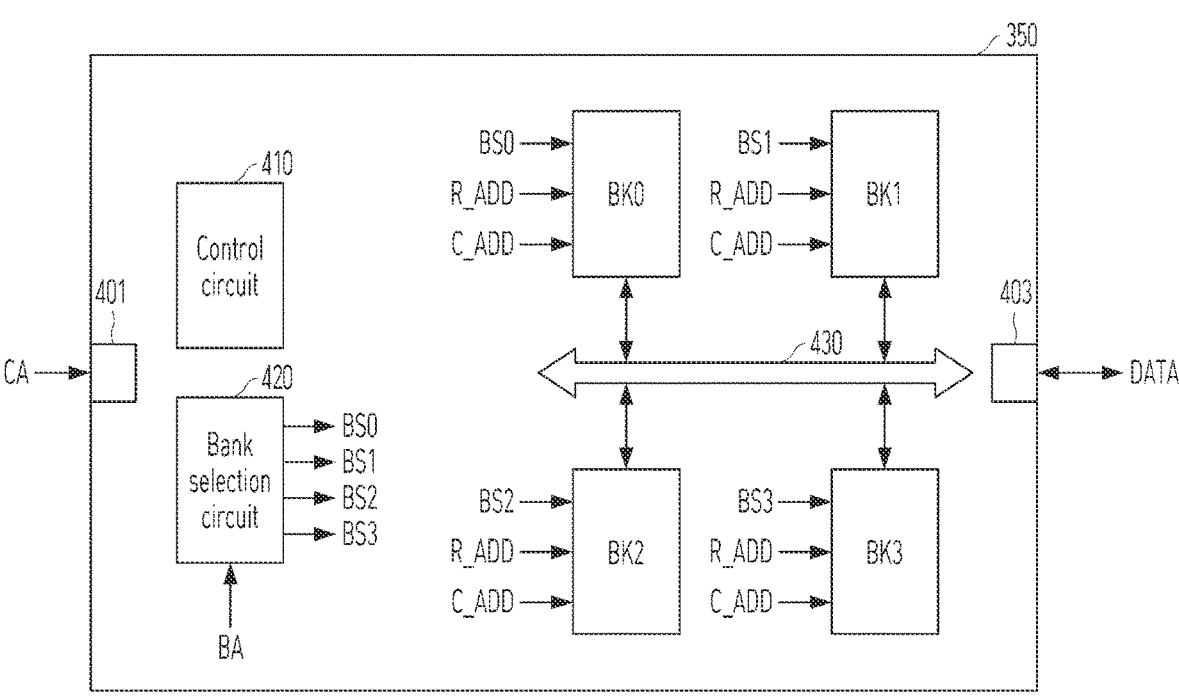
FIG. 4 is a diagram illustrating a configuration of a memory in FIG. 3, according to an embodiment of the present disclosure.

FIG. 4 is a diagram illustrating a configuration of the memory 350 in FIG. 3, according to an embodiment of the present disclosure.

Referring to FIG. 4, the memory 350 may include a command/address reception circuit 401, a data transmission/reception circuit 403, a control circuit 540, a bank selection circuit 420, a data bus 430, and memory banks BK0 to BK3.

The command/address reception circuit 401 may receive a command/address CA that are transmitted by the memory controller 310. The command/address CA may include signals having multiple bits.

The data transmission/reception circuit 403 may transmit and receive the data DATA to and from the memory controller 310. The data DATA may include multiple bits. The data DATA may include data (i.e., user data) and metadata.

The control circuit 410 may control the overall operation of the memory 350. The control circuit 410 may control components within the memory 350 so that the memory 350 can perform operations that are instructed by a command/address CA. The operations that are performed by the memory 350 may include an active operation, a precharge operation, a read operation, a write operation, and a refresh operation. Furthermore, the control circuit 410 may activate or deactivate the metadata mode of the memory 350 based on an instruction from the memory controller 310.

The bank selection circuit 420 may generate bank selection signals BS0 to BS3 for selecting one of the memory banks BK0 to BK3 by using a bank address BA, among addresses that are received through the command/address reception circuit 401. When the memory bank BK0 is selected by the bank address BA, the bank selection signal BS0 may be activated. When the memory bank BK2 is selected, the bank selection signal BS2 may be activated.

The data bus 430 may be a bus for transmitting data between the data transmission/reception circuit 403 and the memory banks BK0 to BK3. After the start of a write operation, data that are received by the data transmission/reception circuit 403 may be transferred to a selected memory bank, among the memory banks BK0 to BK3, through the data bus 430. After the start of a read operation, data that are read from a selected memory bank, among the memory banks BK0 to BK3, may be transferred to the data transmission/reception circuit 403 through the data bus 430.

The memory banks BK0 to BK3 may store data. When the metadata mode is activated, data and metadata may be stored in the memory banks BK0 to BK3. When the metadata mode is deactivated, data may be stored in the memory banks BK0 to BK3, and metadata might not be stored in the memory banks BK0 to BK3. In this case, an example in which the memory 350 includes the four memory banks BK0 to BK3 has been illustrated, but the memory 350 may include various numbers of memory banks, such as 16 or 32.

Figure 5:
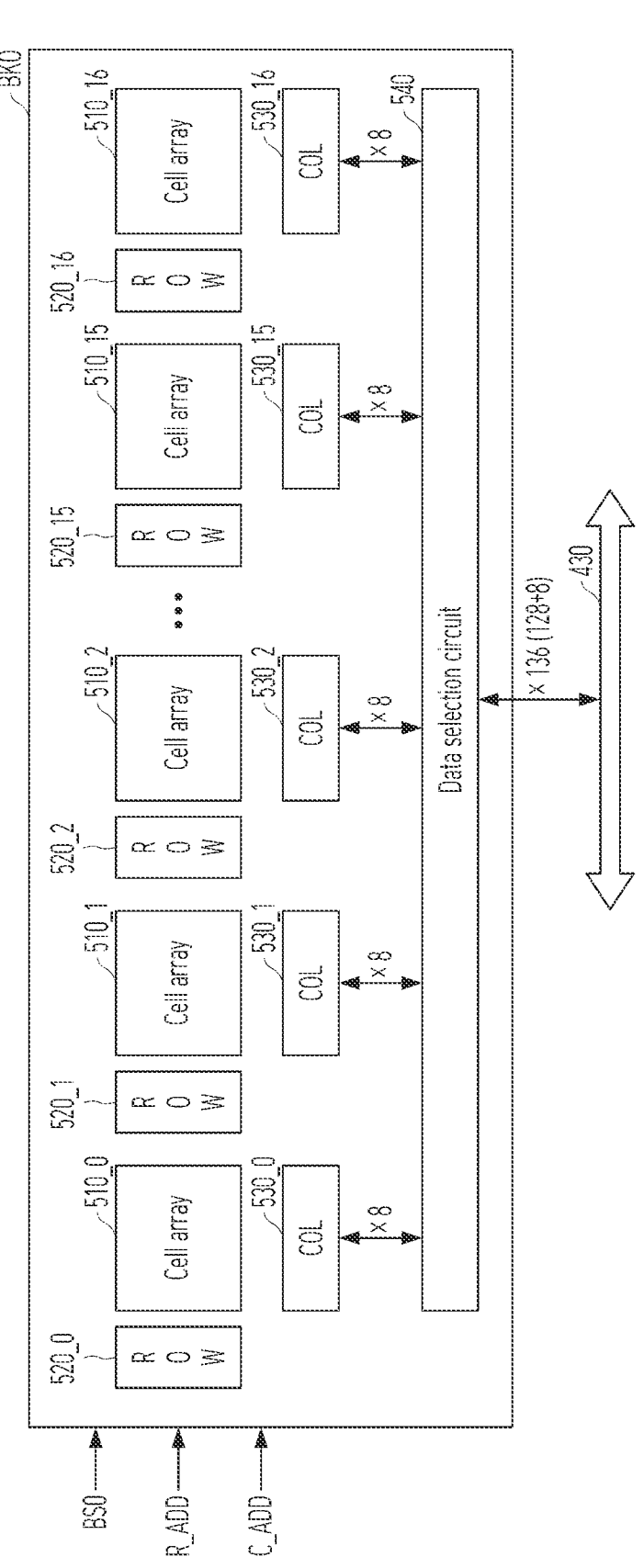
FIG. 5 is a diagram illustrating a configuration of a memory bank in FIG. 4, according to an embodiment of the present disclosure.

FIG. 5 is a diagram illustrating a configuration of the memory bank BK0 in FIG. 4, according to an embodiment of the present disclosure.

Referring to FIG. 5, the memory bank BK0 may include cell arrays 510_0 to 510_16, row circuits 520_0 to 520_16, column circuits 530_0 to 530_16, and a data selection circuit 540.

Each of the cell arrays 510_0 to 510_16 may include multiple memory cells that are arranged in multiple rows and multiple columns.

The row circuits 520_0 to 520_16 may perform an active operation of activating a row that has been selected by a row address R_ADD, among the multiple rows of the cell arrays 510_0 to 510_16. For example, the row circuit 520_0 may activate a row that has been selected by the row address R_ADD in the cell array 510_0 after the start of an active operation. The row circuit 520_3 may activate a row that has been selected by the row address R_ADD in the cell array 510_3 after the start of an active operation. During the active operation, data of memory cells in a selected row may be sensed and amplified.

The column circuits 530_0 to 530_16 may write data into memory cells in columns that have been selected by the column address C_ADD, among the columns of a row that has been selected by the row circuits 520_0 to 520_16 in the cell arrays 510_0 to 510_16, or may read data from the memory cells in the selected columns. That is, the column circuits 530_0 to 530_16 may perform an operation of reading data from or writing data into the memory cells corresponding to the selected row and selected columns in the cell arrays 510_0 to 510_16. For example, the column circuit 530_1 may write data into or read data from memory cells in columns that have been selected by the column address C_ADD in a row that has been selected by the row circuit 520_1 in the cell array 510_1. Operations of the column circuits 530_0 to 530_16 may be different when the metadata mode is activated and when the metadata mode is deactivated. This is described in detail later.

The data selection circuit 540 may control a connection between the column circuits 530_0 to 530_16 and the data bus 430. When the metadata mode is activated, the data selection circuit 540 may connect all of the column circuits 530_0 to 530_16 and the data bus 430. That is, when the metadata mode is activated, 128-bit data may be transmitted and received between the column circuits 530_0 to 530_15 and the data bus 430, and 8-bit metadata may be transmitted and received between the column circuit 530_16 and the data bus 430. When the metadata mode is deactivated, the data selection circuit 540 may connect some of the column circuits 530_0 to 530_16 and the data bus 430. When the metadata mode is deactivated, whether the data selection circuit 540 will connect one of the column circuits 530_0 to 530_16 to the data bus 430 may be determined by the column address C_ADD. This is described in detail later.

The memory banks BK1 to BK3 may also be constructed like the memory bank BK0 in FIG. 5.

Figure 6:
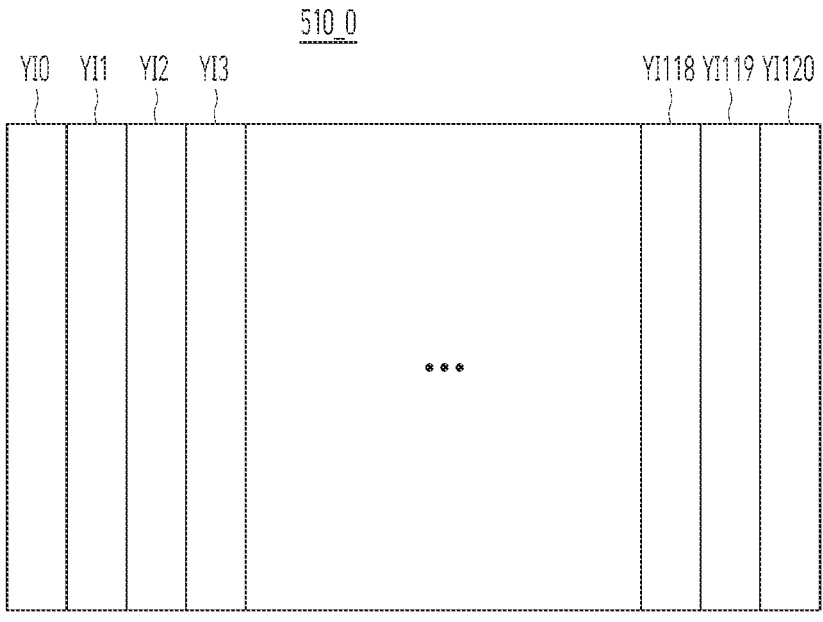
FIG. 6 is a diagram illustrating a configuration of columns of a cell array in FIG. 5, according to an embodiment of the present disclosure.

FIG. 6 is a diagram illustrating a configuration of the columns of the cell array 510_0 in FIG. 5, according to an embodiment of the present disclosure.

Referring to FIG. 6, column selection signals YI0 to YI120 may be signals that are used to select the columns of the cell array 510_0. After the start of read and write operations, one of the column selection signals YI0 to YI120 may be activated. 8 columns corresponding to the activated column selection signal may be accessed. For example, when the column selection signal YI89 is activated in the state in which a No. 63 row has been activated (or selected), eight memory cells corresponding to the column selection signal YI89 in the No. 63 row of the cell array 510_0 may be accessed. The column selection signals YI0 to YI120 may be generated by the column circuit 530_0 corresponding to the cell array 510_0.

The number of cases of columns that are accessible in the cell array 510 may be 121 because the 121 column selection signals YI0 to YI120 are used in the cell array 510_0. The cell arrays 510_0 to 510_16 may also be constructed like the cell array 510_0 in FIG. 6.

FIG. 7 is a diagram for describing read and write operations of the memory bank BK0 in FIG. 5 based on the value of the column address C_ADD when the metadata mode of the memory 350 in FIG. 4 is activated, according to an embodiment of the present disclosure. In this case, the memory bank BK0, among the memory banks BK0 to BK3 of the memory 350, has been selected by the bank address BA.

Referring to FIG. 7, it may be seen that when the value of the column address C_ADD is 0, the column selection signal YI0 is activated in the cell arrays 510_0 to 510_16. Furthermore, it may be seen that when the value of the column address C_ADD is 3, the column selection signal YI3 is activated in the cell arrays 510_0 to 510_16. 128-bit data may be distributed to, read from, and written into the cell arrays 510_0 to 510_15 by 8 bits. 8-bit metadata may be read from and written into the cell array 510_16. In FIG. 7, (M) is marked in the portions of the cell array 510_16. This may be for indicating that metadata is stored in the portions.

When the metadata mode is activated, the column address C_ADD may have the value of 0 to 120. The column circuits 530_0 to 530_16 may activate the same column selection signals YI as the value of the column address C_ADD. Furthermore, when the metadata mode is activated, the data selection circuit 540 may connect all of the column circuits 530_0 to 530_16 to the data bus 430 because all of the cell arrays 510_0 to 510_16 are accessed.

FIGS. 8A to 8D are diagrams for describing read and write operations of the memory bank BK0 in FIG. 5 based on the value of the column address C_ADD when the metadata mode of the memory 350 in FIG. 4 is deactivated. In this case, the memory bank BK0, among the memory banks BK0 to BK3 of the memory 350, has been selected by the bank address BA.

In FIG. 8A, X may mean that any column selection signal in a corresponding cell array is not activated. That is, a cell array indicated by X may mean that the cell array is a no-access cell array. It may be seen that when the value of the column address C_ADD is 0, a column selection signal is not activated in the cell array 510_0 and the column selection signal YI0 is activated in the cell arrays 510_1 to 510_16. In this case, the data selection circuit 540 may connect the column circuits 530_1 to 530_16 to the data bus 430. That is, when the value of the column address C_ADD is 0, the cell array 510_0 may be a no-access cell array.

It may be seen that when the value of the column address C_ADD is 1, a column selection signal is not activated in the cell array 510_1 and the column selection signal YI1 is activated in the cell arrays 510_0 and 510_2 to 510_16. In this case, the data selection circuit 540 may connect the column circuits 530_0 and 530_2 to 530_16 to the data bus 430. That is, when the value of the column address C_ADD is 1, the cell array 510_1 may be a no-access cell array.

When the metadata mode is deactivated, 128-bit data may be distributed to and stored in the remaining cell arrays except a no-access cell array, among the cell arrays 510_0 to 510_16, by 8 bits.

Referring to FIGS. 8A to 8D, it may be seen that when the value of the column address C_ADD is within a first range 0 to 120, one of the cell arrays 510_0 to 510_15 becomes a no-access cell array. Which one of the cell arrays 510_0 to 510_15 will become a no-access cell array may be determined by the value of the column address C_ADD. For example, when the value of the column address C_ADD is 100, the cell array 510_4 may become a no-access cell array. When the value of the column address C_ADD is 101, the cell array 510_5 may become a no-access cell array. When the value of the column address C_ADD is within the first range 0 to 120, a column selection signal having the same number in the remaining cell arrays except a no-access cell array may be activated.

When the value of the column address C_ADD is within a second range 121 to 127, the cell array 510_16 may become a no-access cell array, and column selection signals having different numbers in the cell arrays 510_0 to 510_15 may be activated. For example, when the value of the column address C_ADD is 121, the column selection signals YI0 to YI15 having different numbers in the cell arrays 510_0 to 510_15 may be activated. Furthermore, when the value of the column address C_ADD is 125, the column selection signals YI64 to YI79 having different numbers in the cell arrays 510_0 to 510_15 may be activated.

Column selection signals that are activated when the value of the column address C_ADD is within the second range 121 to 127 may be column selection signals to which access has been excluded when the value of the column address C_ADD is within the first range 0 to 120. For example, when the value of the column address C_ADD is 0, the column selection signal YI0 of the cell array 510_0 might not be activated. In contrast, when the value of the column address C_ADD is 121, the column selection signal YI0 of the cell array 510_0 may be activated. Furthermore, when the value of the column address C_ADD is 98, the column selection signal YI98 of the cell array 510_2 might not be activated. In contrast, when the value of the column address C_ADD is 127, the column selection signal YI98 of the cell array 510_2 may be activated.

The data selection circuit 540 may connect the remaining column circuits except a column circuit corresponding to a no-access cell array, among the column circuits 530_0 to 530_16, and the data bus 430. For example, when the value of the column address C_ADD is 8, the data selection circuit 540 may connect the column circuits 530_0 to 530_7 and 530_9 to 530_16 corresponding to the remaining cell arrays 510_0 to 510_7 and 510_9 to 510_16, respectively, except the cell array 510_8, that is, a no-access cell array, and the data bus 430. Furthermore, when the value of the column address C_ADD is 100, the data selection circuit 540 may connect the column circuits 530_0 to 530_3 and 530_5 to 530_16 corresponding to the remaining cell arrays 510_0 to 510_3 and 510_5 to 510_16, respectively, except the cell array 510_4, that is, a no-access cell array, and the data bus 430.

The cell arrays 510_0 to 510_16 may each be accessed by the 121 column selection signals YI0 to YI120. However, the range of the value of the column address C_ADD that is accessible in the cell arrays 510_0 to 510_16 may be 0 to 127 by using a method of designating a no-access cell array in the cell arrays 510_0 to 510_16 based on the value of the column address C_ADD.

As illustrated in FIG. 7, when the metadata mode is activated, the memory bank BK0 may be accessible by the column address C_ADD having the value of 0 to 120. As illustrated in FIGS. 8A to 8D, when the metadata mode is deactivated, the memory bank BK0 may be accessible by the column address C_ADD having the value of 0 to 127. This may be possible by using no-access cell arrays when the value of the column address C_ADD is 121 to 127, and which are not used when the value of the column address C_ADD is 0 to 120. It is possible to prevent the cell arrays 510_0 to 510_16 in the memory bank BK0 from being wasted without being used by using such a method.

Figure 9:
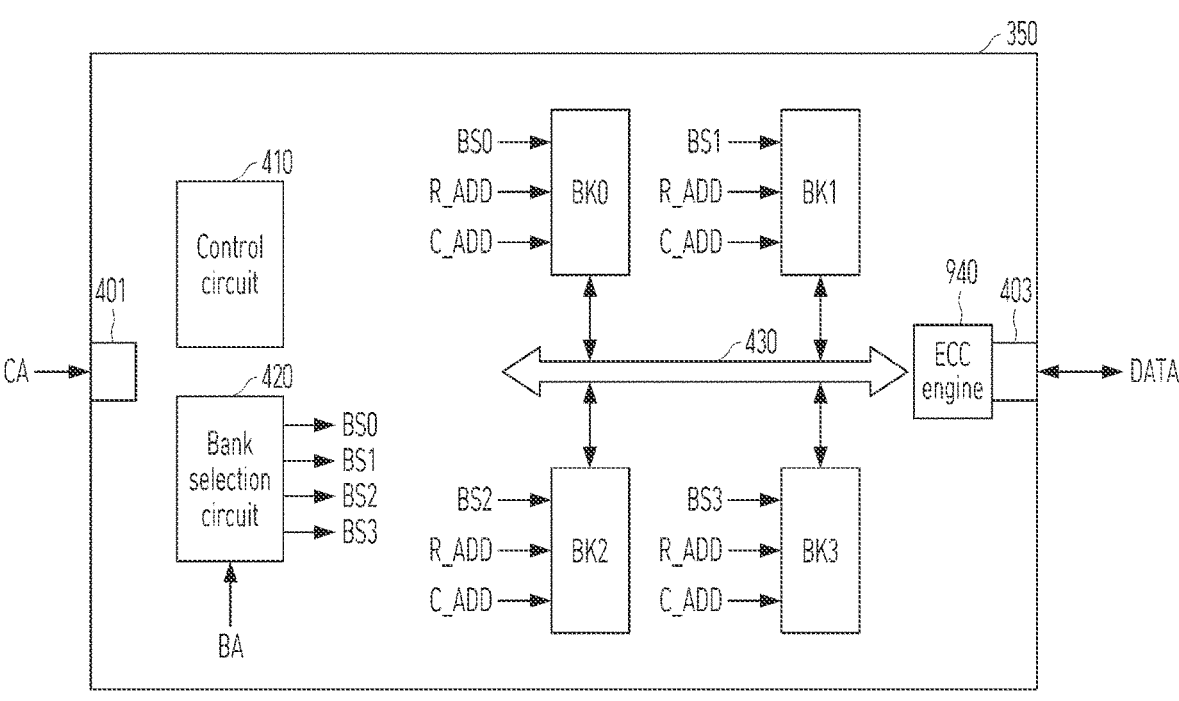
FIG. 9 is a diagram illustrating a configuration of the memory in FIG. 3, according to an embodiment of the present disclosure.

FIG. 9 is a diagram illustrating a configuration of the memory 350 in FIG. 3, according to an embodiment of the present disclosure. An embodiment in which an ECC engine 940 has been added compared to the embodiment of FIG. 4 will be described with reference to FIG. 9.

Referring to FIG. 9, the memory 350 may include the command/address reception circuit 401, the data transmission/reception circuit 403, the control circuit 410, the bank selection circuit 420, the data bus 430, the ECC engine 940, and the memory banks BK0 to BK3.

The ECC engine 940 may generate an error correction code by using data, or data and metadata, that are received by the data transmission/reception circuit 403 after the start of a write operation. The data, or the data and the metadata, and the error correction code generated by the ECC engine may be transmitted to the data bus 430. For example, when the metadata mode is deactivated, the ECC engine 940 may generate an 8-bit error correction code by using 128-bit data and transmit the 128-bit data and 8-bit metadata to the data bus 430. When the metadata mode is activated, the ECC engine 940 may generate an 8-bit error correction code by using 128-bit data and 8-bit metadata, and may transmit the 128-bit data, the 8-bit metadata, and the 8-bit error correction code to the data bus 430. In the embodiment of FIG. 9, compared to the embodiment of FIG. 4, after the start of a write operation, an error correction code may be further stored in a memory bank that is selected among the memory banks BK0 to BK3.

After the start of a read operation, the ECC engine 940 may correct an error of data, or data and metadata, that are transferred by the data bus 430 by using an error correction code that is transferred by the data bus 430, and may transmit the data, or the data and the metadata, having the error corrected to the data transmission/reception circuit 403. For example, when the metadata mode is deactivated, the ECC engine 940 may correct an error of 128-bit data by using an 8-bit error correction code, and may transmit the 128-bit data having the error corrected to the data transmission/reception circuit 403. When the metadata mode is activated, the ECC engine 940 may correct an error of 128-bit data and 8-bit metadata by using an 8-bit error correction code, and may transmit the 128-bit data and the 8-bit metadata having the error corrected to the data transmission/reception circuit 403.

The memory banks BK0 to BK3 may store data, metadata, and an error correction code when the metadata mode is activated, and may store data and an error correction code when the metadata mode is deactivated.

FIG. 9 shows that one ECC engine 940 is included in the memory 350, but the ECC engine may be included in each of the memory banks BK0 to BK3.

Figure 10:
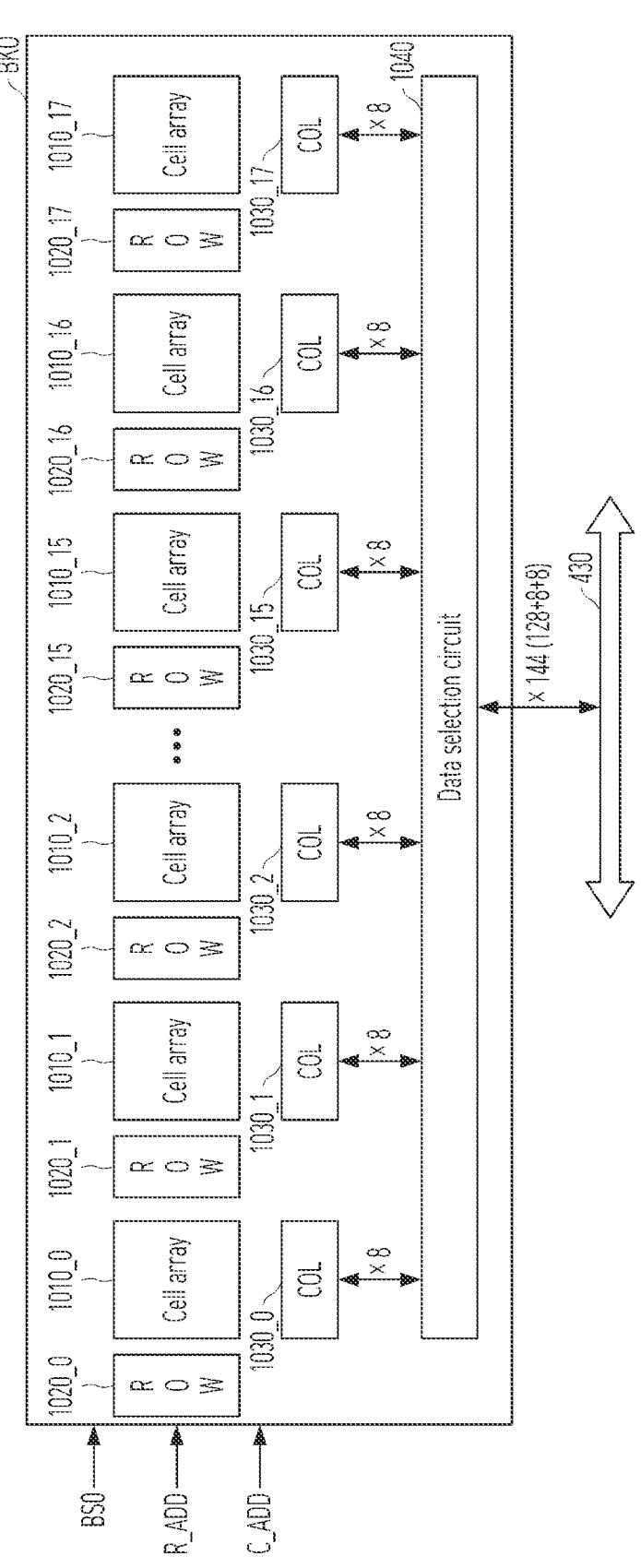
FIG. 10 is a diagram illustrating a configuration of a memory bank in FIG. 9, according to an embodiment of the present disclosure.

FIG. 10 is a diagram illustrating a configuration of the memory bank BK0 in FIG. 9, according to an embodiment of the present disclosure.

Referring to FIG. 10, the memory bank BK0 may include cell arrays 1010_0 to 1010_17, row circuits 1020_0 to 1020_17, column circuits 1030_0 to 1030_17, and a data selection circuit 1040.

Each of the cell arrays 1010_0 to 1010_17 may include multiple memory cells that are arranged in multiple rows and multiple columns. From FIG. 10, it may be seen that the number of cell arrays in the memory bank BK0 is one more than the number of cell arrays in the memory bank BK0 of FIG. 5 because the memory bank BK0 of FIG. 10 has to further store an error correction code. The columns of each of the cell arrays 1010_0 to 1010_17 may be constructed identically with those of FIG. 6. That is, 121 column selection signals YI0 to YI120 may be used in each of the cell arrays 1010_0 to 1010_17.

The row circuits 1020_0 to 1020_17 may perform an active operation of activating a row that has been selected by a row address R_ADD, among the multiple rows of the cell arrays 1010_0 to 1010_17.

The column circuits 1030_0 to 1030_17 may write data into memory cells in columns that have been selected by a column address C_ADD, among the columns of a row that has been selected by the row circuits 1020_0 to 1020_17 in the cell arrays 1010_0 to 1010_17, and may read data from the memory cells in the selected columns. That is, the column circuits 1030_0 to 1030_17 may perform an operation of reading data from or writing data into memory cells corresponding to a selected row and selected columns in the cell arrays 1010_0 to 1010_17. Operations of the column circuits 1030_0 to 1030_17 may be different when the metadata mode is activated and when the metadata mode is deactivated. This is described in detail later.

The data selection circuit 1040 may control a connection between the column circuits 1030_0 to 1030_17 and the data bus 1030. When the metadata mode is activated, the data selection circuit 1040 may connect all of the column circuits 1030_0 to 1030_17 and the data bus 430. That is, when the metadata mode is activated, 128-bit data may be transmitted and received between the column circuits 1030_0 to 1030_15 and the data bus 430, 8-bit metadata may be transmitted and received between the column circuit 1030_16 and the data bus 430, and 8-bit error correction code may be transmitted and received between the column circuit 1030_17 and the data bus 430.

When the metadata mode is deactivated, the data selection circuit 1040 may connect some of the column circuits 1030_0 to 1030_17 and the data bus 430. When the metadata mode is deactivated, which one of the column circuits 1030_0 to 1030_17 will be connected to the data bus 430 by the data selection circuit 1040 may be determined by a column address C_ADD. This is described in detail later.

FIG. 11 is a diagram for describing read and write operations of the memory bank BK0 in FIG. 10 based on the value of the column address C_ADD when the metadata mode of the memory 350 in FIG. 9 is activated, according to an embodiment of the present disclosure. In this case, the memory bank BK0, among the memory banks BK0 to BK3 of the memory 350, has been selected by a bank address BA.

Referring to FIG. 11, it may be seen that when the value of the column address C_ADD is 0, the column selection signal YI0 is activated in the cell arrays 1010_0 to 1010_17. Furthermore, it may be seen that when the value of the column address C_ADD is 3, the column selection signal YI3 is activated in the cell arrays 1010_0 to 1010_17. 128-bit data may be distributed to, read from, and written into the cell arrays 1010_0 to 1010_15 by 8 bits. 8-bit metadata may be read from and written into the cell array 1010_16. An 8-bit error correction code may be read from and written into the cell array 1010_17. In FIG. 11, (M) is marked in the portions of the cell array 1010_16. This may be for indicating that metadata are stored in the portions. Furthermore, in FIG. 11, (E) is marked in the portions of the cell array 1010_17. This may be for indicating that an error correction code is stored in the portions.

When the metadata mode is activated, the column address C_ADD may have the value of 0 to 120. The column circuits 1030_0 to 1030_17 may activate the column selection signals YI having the same value as the column address C_ADD. Furthermore, when the metadata mode is activated, the data selection circuit 1040 may connect all of the column circuits 1030_0 to 1030_17 to the data bus 430 because all of the cell arrays 1010_0 to 1010_17 are accessed.

FIGS. 12A to 12D are diagrams for describing read and write operations of the memory bank BK0 in FIG. 10 based on the value of the column address C_ADD when the metadata mode of the memory 350 in FIG. 9 is deactivated, according to an embodiment of the present disclosure. In this case, the memory bank BK0, among the memory banks BK0 to BK3 of the memory 350, has been selected by the bank address BA.

In FIG. 12A, X may mean that any column selection signal is not activated in a corresponding cell array. That is, a cell array indicated by X may mean a no-access cell array. It may be seen that when the value of the column address C_ADD is 0, a column selection signal is not activated in the cell array 1010_0 and the column selection signal YI0 is activated in the cell arrays 1010_1 to 1010_17. In this case, the data selection circuit 1040 may connect the column circuits 1030_1 to 1030_17 and the data bus 430. That is, when the value of the column address C_ADD is 0, the cell array 1010_0 may be a no-access cell array.

It may be seen that when the value of the column address C_ADD is 1, a column selection signal is not activated in the cell array 1010_1 and the column selection signal YI1 is activated in the cell arrays 1010_0 and 1010_2 to 1010_17. In this case, the data selection circuit 1040 may connect the column circuits 1030_0 and 1030_2 to 1030_17 and the data bus 430. That is, when the value of the column address C_ADD is 1, the cell array 1010_1 may be a no-access cell array.

When the metadata mode is deactivated, 128-bit data and an 8-bit error correction code may be distributed to and stored in the remaining cell arrays except a no-access cell array, among the cell arrays 1010_0 to 1010_17, by 8 bits. A cell array in which an error correction code is stored, among the cell arrays 1010_0 to 1010_17, is indicated by (E) along with a column selection signal. For example, when the value of the column address C_ADD is 0, 128-bit data may be distributed to and stored in portions corresponding to the column selection signals YI0 of the cell arrays 1010_0 to 1010_16, and an 8-bit error correction code may be stored in a portion corresponding to the column selection signal YI0 of the cell array 1010_17. When the value of the column address C_ADD is 1, 128-bit data may be distributed to and stored in portions corresponding to the column selection signals YI1 of the cell arrays 1010_0 and 1010_2 to 1010_16, and an 8-bit error correction code may be stored in portions corresponding to the column selection signal YI1 of the cell array 1010_17.

Referring to FIGS. 12A to 12D, it may be seen that when the value of the column address C_ADD is within the first range 0 to 120, one of the cell arrays 1010_0 to 1010_16 becomes a no-access cell array. Which one of the cell arrays 1010_0 to 1010_16 will become a no-access cell array may be determined by the value of the column address C_ADD. For example, when the value of the column address C_ADD is 0 to 111, the cell arrays 1010_0 to 1010_15 may alternately become no-access cell arrays. When the value of the column address C_ADD is 112 to 120, the cell array 1010_16 may become a no-access cell array. When the value of the column address C_ADD is within the first range 0 to 120, a column selection signal having the same number in cell arrays except a no-access cell array may be activated.

When the value of the column address C_ADD is within the second range 121 to 127, the cell array 1010_17 may become a no-access cell array, and column selection signals having different numbers in the cell arrays 1010_0 to 1010_16 may be activated. Furthermore, when the value of the column address C_ADD is within the second range 121 to 127, 128-bit data may be distributed to and stored in the cell arrays 1010_0 to 1010_15, and an 8-bit error correction code may be stored in the cell array 1010_16. For example, when the value of the column address C_ADD is 125, the column selection signals YI64 to YI79 and YI117 having different numbers in the cell arrays 1010_0 to 1010_17 may be activated. Furthermore, when the value of the column address C_ADD is 127, the column selection signals YI96 to YI111 and YI119 having different numbers in the cell arrays 1010_0 to 1010_17 may be activated.

Column selection signals that are activated when the value of the column address C_ADD is within the second range 121 to 127 may be column selection signals to which access has been excluded when the value of the column address C_ADD is within the first range 0 to 120. For example, when the value of the column address C_ADD is 0, the column selection signal YI0 of the cell array 1010_0 might not be activated. When the value of the column address C_ADD is 121, the column selection signal YI0 of the cell array 1010_0 may be activated. Furthermore, when the value of the column address C_ADD is 115, the column selection signal YI115 of the cell array 1010_16 might not be activated. When the value of the column address C_ADD is 123, the column selection signal YI115 of the cell array 1010_16 may be activated.

The data selection circuit 1040 may connect the remaining column circuits except a column circuit corresponding to a no-access cell array, among the column circuits 1030_0 to 1030_17, and the data bus 430. For example, when the value of the column address C_ADD is 112, the data selection circuit 1040 may connect the column circuits 1030_0 to 1030_15 and 1030_17 corresponding to the remaining cell arrays 1010_0 to 1010_15 and 1010_17, respectively, except the cell array 1010_16, that is, a no-access cell array, and the data bus 430. Furthermore, when the value of the column address C_ADD is 99, the data selection circuit 1040 may connect the column circuits 1030_0 to 1030_2 and 1030_4 to 1030_17 corresponding to the remaining cell arrays 1010_0 to 1010_2 and 1010_4 to 1010_17, respectively, except the cell array 1010_3, that is, a no-access cell array, and the data bus 430.

Each of the cell arrays 1010_0 to 1010_17 may be accessed by the 121 column selection signals YI0 to YI120. However, the range of the value of the column address C_ADD that is accessible in the cell arrays 1010_0 to 1010_17 may be 0 to 127 by using a method of designating a no-access cell array in the cell arrays 1010_0 to 1010_17 based on the value of the column address C_ADD.

As illustrated in FIG. 11, when the metadata mode is activated, the memory bank BK0 may be accessed by the column address C_ADD having the value of 0 to 120. As illustrated in FIGS. 12A to 12D, when the metadata mode is deactivated, the memory bank BK0 may be accessed by the column address C_ADD having the value of 0 to 127. This may be possible by using no-access cell arrays when the value of the column address C_ADD is 121 to 127, and which are not used when the value of the column address C_ADD is 0 to 120. It is possible to prevent the cell arrays 1010_0 to 1010_17 from being wasted without being used in the memory bank BK0 by using such a method.

The numbers illustrated in the aforementioned embodiments are merely examples, and may be changed according to other embodiments. For example, after the start of read and write operations of the memory, a unit by which data are read and written may be 256 bits not 128 bits. The number of bits of metadata may be a different number of bits not 8 bits. The number of bits of the error correction code might not be 8 bits. Furthermore, a no-access cell array that is determined based on the value of a column address may be different from that in the illustrated drawings.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure. Furthermore, the embodiments may be combined to form additional embodiments.

What is claimed is:

1. A memory comprising:
a data transmission/reception circuit; and
a memory bank including a plurality of cell arrays, wherein:
when a metadata mode is activated, data and metadata received through the data transmission/reception circuit are distributed to and stored in the plurality of cell arrays, and
when the metadata mode is deactivated, the data received through the data transmission/reception circuit are distributed to and stored in cell arrays except one or more no-access cell arrays, among the plurality of cell arrays,
wherein a first number (N) of cases of a column address that is accessible when the metadata mode is activated and a second number (M) of cases of the column address that is accessible when the metadata mode is deactivated are different from each other, where N is an integer equal to or greater than 2, and M is greater than N, and
wherein:
a range of a value of the column address, when the metadata mode is deactivated, comprises a first range and a second range, when the value of the column address is within the first range, columns having an identical location in each of the cell arrays except the one or more no-access cell arrays, among the plurality of cell arrays, are accessed, and
when the value of the column address is within the second range, columns having different locations in each of the cell arrays except the one or more no-access cell arrays, among the plurality of cell arrays, are accessed.

2. The memory of claim 1, wherein the one or more no-access cell arrays are determined by an address.

3. The memory of claim 2, wherein the address is a column address.

4. The memory of claim 1, wherein the second number of cases of the column address is greater than the first number of cases of the column address.

5. The memory of claim 1, wherein when the metadata mode is activated, columns having an identical location in the plurality of cell arrays are accessed.

6. The memory of claim 1, further comprising a data bus for transferring data between the data transmission/reception circuit and the memory bank,
wherein the memory bank further comprises a data selection circuit for a connection between the data bus and cell arrays to be accessed, among the plurality of cell arrays.

7. The memory of claim 1, wherein the data transmission/reception circuit is configured to:
receive the metadata through a plurality of data pads after receiving the data through the plurality of data pads when the metadata mode is activated; and
receive the data through the plurality of data pads when the metadata mode is deactivated.

8. The memory of claim 1, wherein the memory comprises a plurality of memory banks.

9. A memory comprising:
a data transmission/reception circuit;
an ECC engine; and
a memory bank including plurality of cell arrays, wherein:
the ECC engine is configured to generate an error correction code by using data and metadata received through the data transmission/reception circuit when a metadata mode is activated, and generate the error correction code by using the data received through the data transmission/reception circuit when the metadata mode is deactivated,
when the metadata mode is activated, the data, the metadata, and the error correction code are distributed to and stored in the plurality of cell arrays, and
when the metadata mode is deactivated, the data and the error correction code are distributed to and stored in cell arrays except one or more no-access cell arrays, among the plurality of cell arrays,
wherein a first number (N) of cases of a column address that is accessible when the metadata mode is activated and a second number (M) of cases of the column address that is accessible when the metadata mode is deactivated are different from each other, where N is an integer equal to or greater than 2, and M is greater than N, and
wherein:
a range of a value of the column address, when the metadata mode is deactivated, comprises a first range and a second range,
when the value of the column address is within the first range, columns having an identical location in each of the cell arrays except the one or more no-access cell arrays, among the plurality of cell arrays, are accessed, and when the value of the column address is within the second range, columns having different locations in each of the cell arrays except the one or more no-access cell arrays, among the plurality of cell arrays, are accessed.

10. The memory of claim 9, wherein the one or more no-access cell arrays are determined by an address.

11. The memory of claim 10, wherein the address is a column address.

12. The memory of claim 9, wherein the second number of cases of the column address is greater than the first number of cases of the column address.

13. The memory of claim 9, wherein when the metadata mode is activated, columns having an identical location in the plurality of cell arrays are accessed.

14. The memory of claim 9, wherein the memory bank further comprises a data selection circuit configured to:

transmit the data, the metadata, and the error correction code to cell arrays to be accessed, among the plurality of cell arrays when the metadata mode is activated; and transmit the data and the error correction code to the cell arrays to be accessed, among the plurality of cell arrays, when the metadata mode is deactivated.

15. The memory of claim 9, wherein the data transmission/reception circuit is configured to:

receive the metadata through a plurality of data pads after receiving the data through the plurality of data pads when the metadata mode is activated; and receive the data through the plurality of data pads when the metadata mode is deactivated.

16. The memory of claim 9, wherein the memory comprises a plurality of memory banks.

17. A memory system comprising:

a memory in which a number of cases of a column address that is accessible is changed depending on a set mode; and a memory controller configured to control the memory, the memory controller including an address conversion circuit configured to convert a system address into a memory address for accessing the memory, wherein the system address is converted into the memory address according to a method that is changed depending on the set mode, wherein:

the memory address comprises a bank address, a row address, and a column address, and the number of cases of the column address that is accessible when a metadata mode is activated is N, where N is an integer equal to or greater than 2, and the number of cases of the column address that is accessible when the metadata mode is deactivated is M, where M is an integer greater than N, and wherein the address conversion circuit is configured to:

convert a quotient that is obtained by dividing a value of the system address by N into the bank address and the row address, and converts a remainder into the column address when the metadata mode is activated, and convert a quotient that is obtained by dividing the value of the system address by M into the bank address and the row address, and converts a remainder into the column address when the metadata mode is deactivated.

18. The memory system of claim 17, wherein the memory comprises:

a data transmission/reception circuit; and a memory bank including plurality of cell arrays, wherein:

when a metadata mode is activated, data and metadata received through the data transmission/reception circuit are distributed to and stored in the plurality of cell arrays, and when the metadata mode is deactivated, the data received through the data transmission/reception circuit are distributed to and stored in cell arrays except one or more no-access cell arrays, among the plurality of cell arrays.

* * * * *